(12) United States Patent
Ni et al.

(10) Patent No.: US 11,567,793 B2
(45) Date of Patent: Jan. 31, 2023

(54) SERVICE MANAGEMENT METHOD AND APPARATUS

(71) Applicant: HUAWEI TECHNOLOGIES CO., LTD, Guangdong (CN)

(72) Inventors: Shaoji Ni, Helsinki (FI); Xuewen Gong, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 218 days.

(21) Appl. No.: 17/018,517

(22) Filed: Sep. 11, 2020

(65) Prior Publication Data

US 2020/0409743 A1    Dec. 31, 2020

Related U.S. Application Data

(63) Continuation of application No. PCT/CN2018/079150, filed on Mar. 15, 2018.

(51) Int. Cl.
*G06F 15/177* (2006.01)
*G06F 9/455* (2018.01)
*H04L 41/0806* (2022.01)
*H04L 41/0893* (2022.01)
*H04L 41/5041* (2022.01)

(52) U.S. Cl.
CPC ...... *G06F 9/45558* (2013.01); *H04L 41/0806* (2013.01); *H04L 41/0893* (2013.01); *H04L 41/5041* (2013.01); *G06F 2009/45595* (2013.01)

(58) Field of Classification Search
CPC ....... G06F 9/45558; G06F 2009/45595; H04L 41/0806; H04L 41/0893; H04L 41/5041
See application file for complete search history.

(56) References Cited

U.S. PATENT DOCUMENTS

2017/0250892 A1    8/2017    Cooper et al.
2018/0367372 A1*  12/2018   Chou ................. H04L 41/0631

FOREIGN PATENT DOCUMENTS

CN        107026802 A      8/2017
CN        107209686 A      9/2017
(Continued)

OTHER PUBLICATIONS

ETSI GS NFV-MAN 001 V1.1.1 (Dec. 2014), Network Functions Virtualisation (NFV); Management and Orchestration. 184 pages.
(Continued)

*Primary Examiner* — Wing F Chan
*Assistant Examiner* — Joseph R Maniwang
(74) *Attorney, Agent, or Firm* — Womble Bond Dickinson (US) LLP

(57) ABSTRACT

Embodiments of this application provide a service management method and apparatus, so as to cover service level indication information at interfaces between various management network elements in NFV MANO, and further perform differentiated resource allocation and fault recovery for services based on the service level indication information. The service management method includes: receiving, by a first management unit, a first message sent by a second management unit, where the first message includes first identification information, the first identification information is used to obtain first information, the first information includes information used to obtain first service level information, and the first information is a network service NS deployment flavor DF or a virtualized network function VNF deployment flavor DF; and determining, by the first management unit, the first service level information based on the first identification information and the first information.

20 Claims, 11 Drawing Sheets

(56) References Cited

FOREIGN PATENT DOCUMENTS

| CN | 107689882 A | 2/2018 |
|---|---|---|
| EP | 3471342 A1 | 4/2019 |
| WO | 2016165292 A1 | 10/2016 |
| WO | 2016180464 A1 | 11/2016 |
| WO | 2017222595 A2 | 12/2017 |

OTHER PUBLICATIONS

ETSI GS NFV-IFA 014 V2 4.1 (Feb. 2018), Network Functions Virtualisation (NFV) Release 2; Management and Drchestration; Network Service Templates Specification, Feb. 2018. total 40 pages.
ETSI GS NFV-IFA 011 V2 4.1 (Feb. 2018), Network Functions Virtualisation (NFV) Release 2; Management and Orchestration; VNF Descriptor and Packaging Specification, Feb. 2018. total 60 pages.
ETSI GS NFV-REL 001 V1.1.1 (Jan. 2015), Network Functions Virtualisation (NFV); Resiliency Requirements, Jan. 2015. total 82 pages.
ETSI GS NFV-IFA 013 V2.4.1 (Feb. 2018), Network Functions Virtualisation (NFV) Release 2; Management and Orchestration; Os-Ma-Nfvo reference point—Interface and Information Model Specification, Feb. 2018. total 151 pages.
ETSI GS NFV-IFA 008 V2.4.1 (Feb. 2018), Network Functions Virtualisation (NFV) Release 2; Management and Orchestration; Ve-Vnfm reference point - Interface and Information Model Specification, Feb. 2018. total 103 pages.

\* cited by examiner

SERVICE MANAGEMENT METHOD AND APPARATUS

CROSS-REFERENCE TO RELATED APPLICATIONS

This application is a continuation of International Application No. PCT/CN2018/079150, filed on Mar. 15, 2018, the disclosure of which is hereby incorporated by reference in its entirety.

TECHNICAL FIELD

This application relates to the telecommunications field, and more specifically, to a service management method and apparatus in the telecommunications field.

BACKGROUND

A conventional telecommunications system includes various dedicated hardware devices. Different hardware devices are used for different applications. As a network scale grows, a system becomes increasingly complex, thereby bringing many challenges, including challenges on development and launching of newly added services, system operation and maintenance, resource utilization, and the like.

Network Functions Virtualization (NFV) aims to develop standard Internet technologies (IT) and virtualization technologies to change a manner in which a network operator constructs a network, so as to integrate various types of network devices into industry-standard high-capacity servers, switches, and storage devices located in various NFV infrastructure network nodes specified by operators. In a conventional high-availability system, such as a telecommunications network element, it is quite difficult to perform operations, such as service availability deployment and configuration, in an end-to-end manner. An availability design in a conventional system is identical for all applications or services, in other words, all services provide a same level of service availability. Because availability and reliability actually "required" by a service are not considered in the system, a service having a relatively low service availability requirement is overprotected in this design, and as a result, excessive system resources are consumed.

In the prior art, when service reliability and availability differentiation of different service types or service groups is operated and managed in an end-to-end manner, information carried in a virtual deployment unit (VDU) is used to indicate service importance or a degree of service importance. However, at least some management units in NFV cannot parse the VDU.

SUMMARY

This application provides a service management method and apparatus, so as to cover service level indication information at interfaces between various management network elements in NFV MANO, and further perform differentiated resource allocation and fault recovery for services based on the service level indication information.

According to a first aspect, a service management method is provided, including:

receiving, by a first management unit, a first message sent by a second management unit, where the first message includes first identification information, the first identification information is used to obtain first information, the first information includes information used to obtain first service level information, and the first information is a network service NS deployment flavor DF or a virtualized network function VNF deployment flavor DF; and determining, by the first management unit, the first service level information based on the first identification information and the first information.

In this embodiment of this application, the first management unit receives the first message sent by the second management unit, and then may determine the first service level information based on the first message, so as to cover service level indication information at interfaces between various management network elements in NFV MANO, and further perform differentiated resource allocation and fault recovery for services based on the service level indication information.

With reference to the first aspect, in some embodiments of the first aspect, the first message is used to request an operation of network service instantiation; and a parameter required for the network service instantiation is provided by using a network service descriptor NSD, the NSD includes at least one NS DF, each of the at least one NS DF is determined based on an identifier of each NS DF, and each of the at least one NS DF includes network service NS service level information.

Therefore, different resource allocation and management can be performed based on different service levels in NS lifecycle management by adding network-service service level information to an NS DF.

With reference to the first aspect, in some embodiments of the first aspect, the first identification information is a first network service NS instance identifier ID and a first network service deployment flavor identifier NS DF ID, the first NS DF ID is used to identify a first NS DF, and a first network service descriptor NSD used for an NS instance identified by the first NS instance ID includes at least the first NS DF; and the determining, by the first management unit, the first service level information based on the first identification information and the first information includes:

using, by the first management unit, network-service service level information in the first NS DF as the first service level information based on the first NS instance ID and the first NS DF ID.

Therefore, the first network service NS instance identifier ID and the first NS DF ID are carried in the first message, so that the first management unit can determine the first NSD and the first NS DF based on the first message, further determine the network-service service level information in the first NS DF, and further provide, based on service importance, different management for lifecycle management of an NS instance and for a virtual resource associated with the network service instance.

With reference to the first aspect, in some embodiments of the first aspect, the method further includes:

determining, by the first management unit, at least one VNF and at least one VL in the first NS instance; and using, by the first management unit, the first service level information as service level information of each of the at least one VNF, and using the first service level information as service level information of each of the at least one VL.

Therefore, different resource allocation and management can be performed in a lifecycle of an NS or a VNF based on different service levels and based on VNF service level information and VL service level information.

With reference to the first aspect, in some embodiments of the first aspect, the network service NS service level information includes at least one of a network-service service availability level SAL or network-service service priority indication information.

With reference to the first aspect, in some embodiments of the first aspect, when the network-service service level information includes the network-service service priority indication information, the network-service service priority indication information is specifically a network service NS service priority identifier, and the network service NS service priority identifier is used to indicate the network service NS service priority level.

With reference to the first aspect, in some embodiments of the first aspect, the first message further includes second identification information, the second identification information is used to identify a first correspondence, and the first correspondence includes a one-to-one correspondence between at least one network service NS service priority identifier and at least one network service NS service priority level; and the determining, by the first management unit, the first service level information based on the first identification information and the first information includes:

determining, by the first management unit based on the first identification information, the second identification information, and the first information, a network-service service priority level indicated by the first service level information.

With reference to the first aspect, in some embodiments of the first aspect, the first message is used to request an operation of network service instantiation; and information required for the network service instantiation is provided by using a network service descriptor NSD, the network service descriptor NSD includes at least one network service deployment flavor NS DF, each of the at least one NS DF is determined based on an identifier, each of the at least one NS DF includes at least one virtualized network function profile VNF profile, each of the at least one virtualized network function profile VNF profile includes one virtualized network function descriptor VNFD and one virtualized network function deployment flavor VNF DF, the virtualized network function descriptor VNFD includes at least one virtualized network function deployment flavor VNF DF, the virtualized network function deployment flavor VNF DF includes virtualized network function service level information, the virtualized network function profile VNF profile is represented by using a VNF profile ID in the NS DF, the VNFD is represented by using a VNFD ID in the VNF profile, and the VNF DF is represented by using a VNF DF ID in the VNF profile and the VNFD.

Therefore, different resource allocation and management can be performed based on different service levels in NS and VNF lifecycle management by adding network-service service level information to a VNF DF.

With reference to the first aspect, in some embodiments of the first aspect, the first identification information is a second NS instance ID and a second NS DF ID, the second NS DF ID is used to identify a second NS DF, a second NSD used for instantiation of a second NS instance identified by the second NS instance ID includes at least the second NS DF, the second NS DF includes at least one first virtualized network function profile VNF profile, each of the first virtualized network function profile VNF profile includes a first virtualized network function descriptor identifier VNFD ID and a first virtualized network function deployment flavor identifier VNF DF ID, the first VNF DF ID is used to identify a first VNF DF, and the first VNFD includes at least the first VNF DF; and the determining, by the first management unit, the first service level information based on the first identification information and the first information includes:

determining, by the first management unit, the second NS DF based on the second NS instance ID and the second NS DF ID; and determining, by the first management unit based on an identifier of each of the at least one first virtualized network function profile VNF profile in the second NS DF, each first VNFD ID and each first VNF DF ID that are included in each first virtualized network function profile VNF profile, and using virtualized network function service level information in each first VNF DF as the first service level information.

Therefore, the second network service NS instance identifier ID and the second NS DF ID are carried in the first message, so that the first management unit can determine the second NS DF and at least one first VNF DF based on the first message, further determine VNF service level information in the at least one first VNF DF, and further provide, based on service importance, different management for lifecycle management of an NS instance and a VNF instance and for virtual resources associated with the NS instance and the VNF instance.

With reference to the first aspect, in some embodiments of the first aspect, the first message is used to request an operation of virtualized network function instantiation; and information required for the virtualized network function instantiation is provided by using a virtualized network function descriptor VNFD, the virtualized network function descriptor VNFD includes at least one virtualized network function deployment flavor VNF DF, each of the at least one VNF DF is determined based on an identifier of each VNF DF, and each of the at least one VNF DF includes one piece of virtualized network function service level information.

Therefore, different resource allocation and management can be performed based on different service levels in VNF lifecycle management by adding network-service service level information to a VNF DF.

With reference to the first aspect, in some embodiments of the first aspect, the first identification information is a second VNF instance ID and a second VNF DF ID, the second VNF DF ID is used to identify a second VNF DF, and a second virtualized network function descriptor VNFD used for instantiation of a VNF instance identified by the second VNF instance ID includes at least the second VNF DF; and the determining, by the first management unit, the first service level information based on the first identification information and the first information includes:

using, by the first management unit, virtualized network function service level information in the second VNF DF as the first service level information based on the second VNF instance ID and the second VNF DF ID.

Therefore, the second VNF instance identifier ID and the second VNF DF ID are carried in the first message, so that the first management unit can determine the second VNFD and the second VNF DF based on the first message, further determine the VNF service level information in the second VNF DF, and further provide, based on service importance, different management for lifecycle management of a VNF instance and for a virtual resource associated with the VNF instance.

With reference to the first aspect, in some embodiments of the first aspect, the first message is an NS update request message, and in this case the first identification information is a third NS instance ID that needs to be updated; the first message further includes information about at least one instantiated VNF; a third NS instance identified by the third NS instance ID includes the information about the at least one instantiated VNF; each piece of the information about the at least one instantiated VNF includes the third VNFD ID and a third VNF DF ID; and a third virtualized network function descriptor VNFD used for instantiation of a VNF instance identified by the third VNF instance ID includes at least the third VNF DF; and the determining, by the first management unit, the first service level information based on the first identification information and the first information includes:

using, by the first management unit, virtualized network function service level information in the third VNF DF as the first service level information based on the third NS instance ID and the information about the at least one instantiated VNF.

Therefore, the third VNF instance identifier ID that needs to be updated and the information about the at least one instantiated VNF are carried in the first message, so that the first management unit can determine the third VNFD and at least one third VNF DF based on the first message, further determine VNF service level information in the at least one third VNF DF, and further provide, based on service importance, different management for lifecycle management of a VNF instance and for a virtual resource associated with the VNF instance.

With reference to the first aspect, in some embodiments of the first aspect, the VNF service level information includes at least one of a VNF service availability level SAL or VNF service priority indication information.

With reference to the first aspect, in some embodiments of the first aspect, when the VNF service level information includes the VNF service priority indication information, the VNF service priority indication information is specifically a VNF service priority identifier, and the service priority identifier is used to indicate the VNF service priority level.

With reference to the first aspect, in some embodiments of the first aspect, the first message further includes third identification information, the third identification information is used to identify a second correspondence, and the second correspondence includes a one-to-one correspondence between at least one service priority identifier and at least one service priority level; and the determining, by the first management unit, the first service level information based on the first identification information and the first information includes:

determining, by the first management unit based on the first identification information, the third identification information, and the first information, a VNF service priority level indicated by the first service level information.

With reference to the first aspect, in some embodiments of the first aspect, if the first service level information is the network-service service level information, after the operation requested by the first message is successfully completed, the method further includes:

recording, by the first management unit, the network-service service level information in an attribute of network service level indication information in a network service information element database, where the network service information element is used to record real-time status information of a network service instance, and the real-time status information of the network service instance includes the network-service service level information.

With reference to the first aspect, in some embodiments of the first aspect, the method further includes:

receiving, by the first management unit, a second message, where the second message is used to modify the network-service service level information in the network service information element, and the second message includes indication information of second service level information; and replacing, by the first management unit, the network-service service level information in the network service information element with the second service level information.

In this embodiment of this application, service level information in an NS deployment flavor is dynamically changed, so that a management unit can provide dynamic management for lifecycle management of the network service instance and for a virtual resource associated with the network service instance.

With reference to the first aspect, in some embodiments of the first aspect, if the first service level information is the VNF service level information, after the operation requested by the first message is successfully completed, the method further includes:

recording, by the first management unit, the VNF service level information in an attribute of VNF indication information in a VNF information element database, where the VNF information element is used to record real-time status information of a VNF instance, and the real-time status information of the VNF instance includes the VNF service level information.

With reference to the first aspect, in some embodiments of the first aspect, the method further includes:

receiving, by the first management unit, a third message, where the third message is used to modify the VNF service level information in the VNF information element, and the second message includes indication information of third service level information; and replacing, by the first management unit, the VNF service level information in the VNF information element with the third service level information.

In this embodiment of this application, service level information in a VNF deployment flavor is dynamically changed, so that a management unit can provide dynamic management for lifecycle management of the VNF instance and for a virtual resource associated with the VNF instance.

With reference to the first aspect, in some embodiments of the first aspect, if the first message is a network service instantiation request, or if the first message is an NS update message, the first management unit is an NFVO, and the second management unit is an operation support system/business support system; or if the first message is a VNF instantiation request, the first management unit is a VNFM and the second management unit is an EM, or the first management unit is a VNFM and the second management unit is an NFVO.

With reference to the first aspect, in some embodiments of the first aspect, the method further includes:

sending, by the first management unit, a fourth message to a third management unit, where the fourth message includes the virtualized network function VNF service level information, the virtualized network function VNF service level information is used to perform resource management or allocation on a virtual resource required for a virtualized network function VNF instance, and the virtual resource includes at least one of a virtual computing resource, a virtual storage resource, or a virtual network resource.

With reference to the first aspect, in some embodiments of the first aspect, the first management unit is an NFVO or a VNFM, and the third management unit is a VIM/WIM; and the fourth message is a virtualized-resource allocation request message, a virtualized-resource migration request message, a virtualized-resource extension request message, or a virtualized-resource creation and reservation request message.

According to a second aspect, a service management method is provided, including:

determining, by a second management unit, a first message, where the first message includes first identification information, the first identification information is used to obtain first information, the first information includes information used to obtain first service level information, and the first information is a network service NS deployment flavor DF or a virtualized network function VNF deployment flavor DF; and sending, by the second management unit, the first message to a first management unit, so that the first management unit determines the first service level information based on the first identification information and the first information.

In this embodiment of this application, the first management unit receives the first message sent by the second management unit, and then may determine the first service level information based on the first message, so as to cover service level indication information at interfaces between various management network elements in NFV MANO, and further perform differentiated resource allocation and fault recovery for services based on the service level indication information.

With reference to the second aspect, in some embodiments of the second aspect, the first message is used to request an operation of network service instantiation; and a parameter required for the network service instantiation is provided by using a network service descriptor NSD, the NSD includes at least one NS DF, each of the at least one NS DF is determined based on an identifier of each NS DF, and each of the at least one NS DF includes network service NS service level information.

Therefore, different resource allocation and management can be performed based on different service levels in NS lifecycle management by adding network-service service level information to an NS DF.

With reference to the second aspect, in some embodiments of the second aspect, the first identification information is a first network service NS instance identifier ID and a first network service deployment flavor identifier NS DF ID, the first NS DF ID is used to identify a first NS DF, and a first network service descriptor NSD used for an NS instance identified by the first NS instance ID includes at least the first NS DF.

Therefore, the first network service NS instance identifier ID and the first NS DF ID are carried in the first message, so that the first management unit can determine the first NSD and the first NS DF based on the first message, further determine the network-service service level information in the first NS DF, and further provide, based on service importance, different management for lifecycle management of an NS instance and for a virtual resource associated with the network service instance.

With reference to the second aspect, in some embodiments of the second aspect, the network service NS service level information includes at least one of a network-service service availability level SAL or network-service service priority indication information.

With reference to the second aspect, in some embodiments of the second aspect, when the network-service service level information includes the network-service service priority indication information, the network-service service priority indication information is specifically a network service NS service priority identifier, and the network service NS service priority identifier is used to indicate the network service NS service priority level.

With reference to the second aspect, in some embodiments of the second aspect, the first message further includes second identification information, the second identification information is used to identify a first correspondence, and the first correspondence includes a one-to-one correspondence between at least one network service NS service priority identifier and at least one network service NS service priority level.

With reference to the second aspect, in some embodiments of the second aspect, the first message is used to request an operation of network service instantiation; and information required for the network service instantiation is provided by using a network service descriptor NSD, the network service descriptor NSD includes at least one network service deployment flavor NS DF, each of the at least one NS DF is determined based on an identifier, each of the at least one NS DF includes at least one virtualized network function profile VNF profile, each of the at least one virtualized network function profile VNF profile includes one virtualized network function descriptor VNFD and one virtualized network function deployment flavor VNF DF, the virtualized network function descriptor VNFD includes at least one virtualized network function deployment flavor VNF DF, the virtualized network function deployment flavor VNF DF includes virtualized network function service level information, the virtualized network function profile VNF profile is represented by using a VNF profile ID in the NS DF, the VNFD is represented by using a VNFD ID in the VNF profile, and the VNF DF is represented by using a VNF DF ID in the VNF profile and the VNFD.

Therefore, different resource allocation and management can be performed based on different service levels in NS and VNF lifecycle management by adding network-service service level information to a VNF DF.

With reference to the second aspect, in some embodiments of the second aspect, the first identification information is a second NS instance ID and a second NS DF ID, the second NS DF ID is used to identify a second NS DF, a second NSD used for instantiation of a second NS instance identified by the second NS instance ID includes at least the second NS DF, the second NS DF includes at least one first virtualized network function profile VNF profile, each of the first virtualized network function profile VNF profile includes a first virtualized network function descriptor identifier VNFD ID and a first virtualized network function deployment flavor identifier VNF DF ID, the first VNF DF ID is used to identify a first VNF DF, and the first VNFD includes at least the first VNF DF.

Therefore, the second network service NS instance identifier ID and the second NS DF ID are carried in the first message, so that the first management unit can determine the second NS DF and at least one first VNF DF based on the first message, further determine VNF service level information in the at least one first VNF DF, and further provide, based on service importance, different management for lifecycle management of an NS instance and a VNF instance and for virtual resources associated with the network service instance and the VNF instance.

With reference to the second aspect, in some embodiments of the second aspect, the first message is used to request an operation of virtualized network function instantiation; and information required for the virtualized network function instantiation is provided by using a virtualized network function descriptor VNFD, the virtualized network function descriptor VNFD includes at least one virtualized network function deployment flavor VNF DF, each of the at least one VNF DF is determined based on an identifier of each VNF DF, and each of the at least one VNF DF includes one piece of virtualized network function service level information.

Therefore, different resource allocation and management can be performed based on different service levels in VNF lifecycle management by adding network-service service level information to a VNF DF.

With reference to the second aspect, in some embodiments of the second aspect, the first identification information is a second VNF instance ID and a second VNF DF ID, the second VNF DF ID is used to identify a second VNF DF, and a second virtualized network function descriptor VNFD used for instantiation of a VNF instance identified by the second VNF instance ID includes at least the second VNF DF.

Therefore, the second VNF instance identifier ID and the second VNF DF ID are carried in the first message, so that the first management unit can determine the second VNFD and the second VNF DF based on the first message, further determine the VNF service level information in the second VNF DF, and further provide, based on service importance, different management for lifecycle management of a VNF instance and for a virtual resource associated with the VNF instance.

With reference to the second aspect, in some embodiments of the second aspect, the first message is an NS update request message, and in this case the first identification information is a third NS instance ID that needs to be updated; the first message further includes information about at least one instantiated VNF; a third NS instance identified by the third NS instance ID includes the information about the at least one instantiated VNF; each piece of the information about the at least one instantiated VNF includes the third VNFD ID and a third VNF DF ID; and a third virtualized network function descriptor VNFD used for instantiation of a VNF instance identified by the third VNF instance ID includes at least the third VNF DF.

Therefore, the third VNF instance identifier ID that needs to be updated and the information about the at least one instantiated VNF are carried in the first message, so that the first management unit can determine the third VNFD and at least one third VNF DF based on the first message, further determine VNF service level information in the at least one third VNF DF, and further provide, based on service importance, different management for lifecycle management of a VNF instance and for a virtual resource associated with the VNF instance.

With reference to the second aspect, in some embodiments of the second aspect, the VNF service level information includes at least one of a VNF service availability level SAL or VNF service priority indication information.

With reference to the second aspect, in some embodiments of the second aspect, when the VNF service level information includes the VNF service priority indication information, the VNF service priority indication information is specifically a VNF service priority identifier, and the service priority identifier is used to indicate the VNF service priority level.

With reference to the second aspect, in some embodiments of the second aspect, the first message further includes third identification information, the third identification information is used to identify a second correspondence, and the second correspondence includes a one-to-one correspondence between at least one service priority identifier and at least one service priority level.

With reference to the second aspect, in some embodiments of the second aspect, if the first service level information is the network-service service level information, after the operation requested by the first message is successfully completed, the method further includes:

sending, by the second management unit, a second message to the first management unit, where the second message is used to modify the network-service service level information in a network service information element, the second message includes indication information of second service level information, the network service information element is used to record real-time status information of a network service instance, and the real-time status information of the network service includes the network-service service level information.

In this embodiment of this application, service level information in an NS deployment flavor is dynamically changed, so that a management unit can provide dynamic management for lifecycle management of the network service instance and for a virtual resource associated with the network service instance.

With reference to the second aspect, in some embodiments of the second aspect, if the first service level information is the VNF service level information, after the operation requested by the first message is successfully completed, the method further includes:

sending, by the second management unit, a third message to the first management unit, where the third message is used to modify the VNF service level information in a VNF information element, the third message includes indication information of second service level information, the VNF information element is used to record real-time status information of a VNF instance, and the real-time status information of the VNF includes the VNF service level information.

In this embodiment of this application, service level information in a VNF deployment flavor is dynamically changed, so that a management unit can provide dynamic management for lifecycle management of the VNF instance and for a virtual resource associated with the VNF instance.

With reference to the second aspect, in some embodiments of the second aspect, when the first message is a network service instantiation request, or when the first message is an NS update message, the first management unit is an NFVO, and the second management unit is an operation support system/business support system; or when the first message is a VNF instantiation request, the first management unit is a VNFM and the second management unit is an EM, or the first management unit is a VNFM and the second management unit is an NFVO.

According to a third aspect, a service management method is provided, including:

receiving, by a third management unit, a fourth message sent by a first management unit, where the fourth message includes virtualized network function VNF service level information, the VNF service level information is used to perform resource management or allocation on a virtual resource required for a virtualized network function VNF instance, and the virtual resource includes at least one of a virtual computing resource, a virtual storage resource, or a virtual network resource.

With reference to the third aspect, in some embodiments of the third aspect, the first management unit is an NFVO or a VNFM, and the third management unit is a VIM/WIM; and the fourth message is a virtualized-resource allocation request message, a virtualized-resource migration request message, a virtualized-resource extension request message, or a virtualized-resource creation and reservation request message.

According to a fourth aspect, a service management apparatus is provided, configured to perform the method according to any one of the foregoing aspects or the embodiments of the foregoing aspects. Specifically, the service management apparatus includes a unit configured to perform the method according to any one of the foregoing aspects or the embodiments of the foregoing aspects.

According to a fifth aspect, a service management apparatus is provided. The service management apparatus includes a transceiver, a memory, a processor, and a bus system. The transceiver, the memory, and the processor are connected to each other by using the bus system. The memory is configured to store an instruction. The processor is configured to execute the instruction stored in the memory, to control the transceiver to receive and/or send a signal. In addition, when the processor executes the instruction stored in the memory, the execution enables the processor to perform the method according to any one of the foregoing aspects or the embodiments of the foregoing aspects.

According to a sixth aspect, a computer readable medium is provided, configured to store a computer program. The computer program includes an instruction used to perform the method according to any one of the foregoing aspects or the embodiments of the foregoing aspects.

According to a seventh aspect, a computer program product is provided. The computer program product includes computer program code. When the computer program code is run by a processing unit of an apparatus (for example, a service management apparatus) or a transceiver and a processor of an apparatus, the service management apparatus is enabled to perform the method according to any one of the foregoing aspects or the embodiments of the foregoing aspects.

DESCRIPTION OF EMBODIMENTS

The following describes technical solutions in this application with reference to accompanying drawings.

Figure 1:
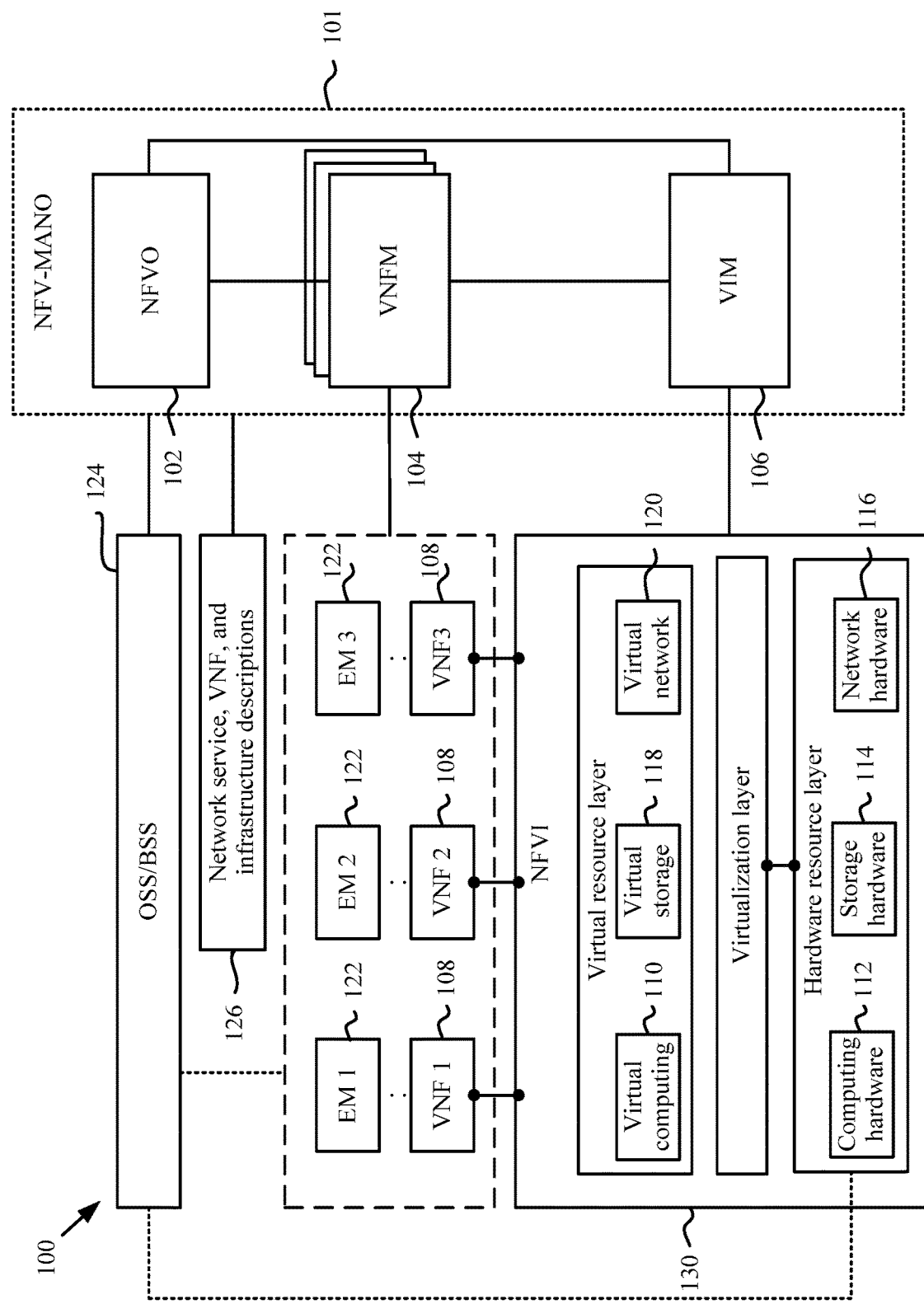
FIG. 1 is an architectural diagram of an NFV system according to an embodiment of this application.

FIG. 1 is an architectural diagram of an NFV system. The NFV system 100 may be used in various networks, for example, may be implemented in a data center network, an operator network, or a local area network. The NFV system 100 includes an NFV management and orchestration system (NFV MANO) 101, an NFV infrastructure layer (NFVI) 130, a plurality of virtualized network functions (VNF) 108, a plurality of element managements (EM) 122, network service, VNF, and infrastructure descriptions 126, and an operation support system/business support system (OSS/BSS) 124.

Network management may be provided by the OSS/BSS 124. The VNF may also be referred to as a service function (SF), or may also be referred to as a network function node, and performs actual service function processing on a service flow. The VNF may be an instance running on a virtual machine. The EM may be one or more VFN management entities.

The NFV management and orchestration system (NFV MANO) 101 includes an NFV orchestrator (NFVO) 102, one or more VNF Managers (VNFM) 104, and a virtualized infrastructure manager (VIM) 106. The NFVI 130 includes computing hardware 112, storage hardware 114, network hardware 116, a virtualization layer, virtual computing 110, a virtual storage 118, and a virtual network 120.

The NFV management and orchestration system (NFV MANO) 101 is a set of all function blocks, data repositories used by the function blocks, reference points, and interfaces. The function blocks exchange information through the reference points and interfaces, so as to manage and orchestrate the NFVI 130 and the VFNs 108. The NFVO 102 may implement a network service (for example, an L2 VPN service and an L3 VPN service) on the NFVI 130, and may also execute a resource-related request that is from the one or more VNFMs 104, send configuration information to the VNFM 104, and collect status information of the VNFs 108. In addition, the NFVO 102 may communicate with the VIM 106, to allocate and/or reserve resources and exchange configuration and status information of virtualized hardware resources. The VNFM 104 may manage one or more VNFs 108. The VNFM 104 may perform various management functions, for example, instantiating, updating, querying for, scaling in/out, and/or terminating the VNF 108. The VIM 106 may perform a resource management function, for example, a function of managing infrastructure resource allocation (for example, adding a resource to a virtual container) and operations (for example, collecting NFVI fault information). The VNFM 104 and the VIM 106 may communicate with each other to allocate resources and exchange configuration and status information of virtualized hardware resources.

The NFVI 130 includes a hardware resource, a software resource, or a combination thereof, to deploy a virtualization environment. The NFVI 130 is a combination of all hardware and software parts. These parts construct a VNF deployment environment. The NFVI 130 may cross several locations. A network providing a connection between the locations may be considered as a part of the NFVI 130.

In other words, the hardware resource and the virtualization layer are used to provide a virtualized resource. For example, the hardware resource and the virtualization layer are used for the VNFs 108, as a virtual machine or a virtual container in another form. The hardware resource includes the computing hardware 112, the storage hardware 114, and the network hardware 116. The computing hardware 112 may be existing hardware on the market and/or user-customized hardware, and is configured to provide processing and computing resources. A storage capacity of the storage hardware 114 may be a storage capacity provided in a network or a storage capacity (a local memory in a server) that resides in the storage hardware 114 itself. In an implementation solution, resources of the computing hardware 112 and the storage hardware 114 may be centralized. The network hardware 116 may be a switch, a router, and/or any other network device that is configured as having a switching function. The network hardware 116 may cross a plurality of domains, and may include a plurality of networks that are interconnected by one or more transport networks.

The virtualization layer in the NFVI 130 may decouple a physical-layer abstract hardware resource from the VNFs 108, to provide a virtualized resource for the VNFs 108. A virtual resource layer includes the virtual computing 110, the virtual memory 118, and the virtual network 120. The virtual computing 110 and the virtual storage 118 may be provided for the VNFs 108 in a form of a virtual machine and/or another virtual container. For example, one or more VNFs 108 may be deployed on a virtual machine. The virtualization layer abstracts the network hardware 116 to form the virtual network 120. The virtual network 120 may include a virtual switch. The virtual switch is configured to provide a connection between a virtual machine and another virtual machine. In addition, the transport network in the network hardware 116 may be virtualized by using a centralized control plane and a separate forwarding plane (for example, software-defined networking, SDN).

In the system architecture shown in FIG. 1, a service level may be represented by using service level information, in other words, service importance or a degree of service importance may be represented by using service level information. For example, a higher service level indicated by the service level information indicates a higher degree of service importance. In this way, by using the service level information, the NFV MANO can provide different reliability resources based on different services and different service importance when applying for a virtual resource for an instance that executes the service, so as to meet a requirement of a service with high importance.

In one embodiment, the service level information may include a service availability level (SAL) value and/or service priority indication information. Alternatively, in this embodiment of this application, the service level information may include other information used to represent service importance or a degree of service importance. This is not limited in this embodiment of this application.

It should be understood that, in this embodiment of this application, the service level information may be specifically network service (NS) service level information, VNF service level information, or virtual link VL service level information. Specifically, the network-service service level information is used to indicate a service level of a network service, the VNF service level information is used to indicate a service level of a VNF, and the virtual link VL service level information is used to indicate a service level on a VL.

Herein, a network service NS may include one or more service flows. Each service flow has a service level agreement (SLA) requirement. The SLA requirement has parameters such as quality of service (QoS), co-location, physical separation, a regulatory constraint, service reliability and availability, and security. A service flow may include a type of service, for example, a voice call service or a game service. In addition, a service flow may include a group of users, for example, quality service-level users or common service-level users. In addition, a service flow may include a specified service, for example, a machine-to-machine (M-to-M) service, or a combination of these and/or similar definitions of a service flow. Herein, a network service may also be referred to as a network service.

A network service may include a group of (namely, at least one) VNFs, and a virtual link (VL) connecting the group of VNFs. The NFV system architecture includes various devices and entities manufactured by a plurality of vendors, and different corresponding dedicated solutions have been applied to these devices and entities. Therefore, having a protocol that can be used for network service chaining (NSC) instantiation and that can implement end-to-end service availability differentiation for service flows may be an advantage, because the group of VNFs may be supported by layers and software of the plurality of vendors, to be specific, supported by VNF software, a virtualization layer, hardware, a virtual network, and the like. Each network function (NF), such as a VNF, and service function forwarding (SFF) may be required to process a service according to a same predefined policy upon an exception such as a fault or overloading.

In this embodiment of this application, in a solution, the service level information may be directly included in interface messages between various management network elements in the NFV MANO, to cover the service level information at interfaces between the various management network elements in the NFV MANO. In another solution, the service level information may be included in a network service NS deployment flavor (DF) or a VNF deployment flavor DF. In addition, identification information or other information used to obtain the NS DF or the VNF DF may be carried in an interface message, so as to cover the service level information at interfaces between various management network elements in the NFV MANO. Therefore, in this embodiment of this application, the NFV MANO can perform differentiated resource allocation and fault recovery for services based on the service level indication information.

Specifically, in a process of network service or virtualized network function instantiation, a network service deployment flavor NS DF is used to input a parameter to customize a specific instantiated network service instance, and a virtualized network function deployment flavor VNF DF is used to input a parameter to customize a specific instantiated VNF instance. The NS DF includes various deployment parameters required during instantiation of network service instances, and various requirements of the instances for virtual resources that need to be allocated. The VNF DF includes various deployment parameters required during instantiation of virtualized network function instances, and various requirements of the instances for virtual resources that need to be allocated. Herein, service level information in the NS DF is network service NS service level information, and is used to indicate a service level of a network service instance instantiated by using the NS DF. Service level information in the VNF DF is VNF service level information, and is used to indicate a service level of a VNF instance instantiated by using the VNF DF. In this way, in this embodiment of this application, different resource allocation and management can be performed based on different service levels in NS or VNF lifecycle management.

The following describes in detail a service management method in the embodiments of this application with reference to specific embodiments.

It should be understood that, in the embodiments of this application, a term "management unit" represents a function component in an NFV architecture. For example, the management unit may be an NFVO, an OSS/BSS, a VIM, a VNFM, or an EM. The "management unit" may also be referred to as a "network element", a "function component", a "device", an "apparatus", or the like. The embodiments of this application are not limited thereto.

Figure 2:
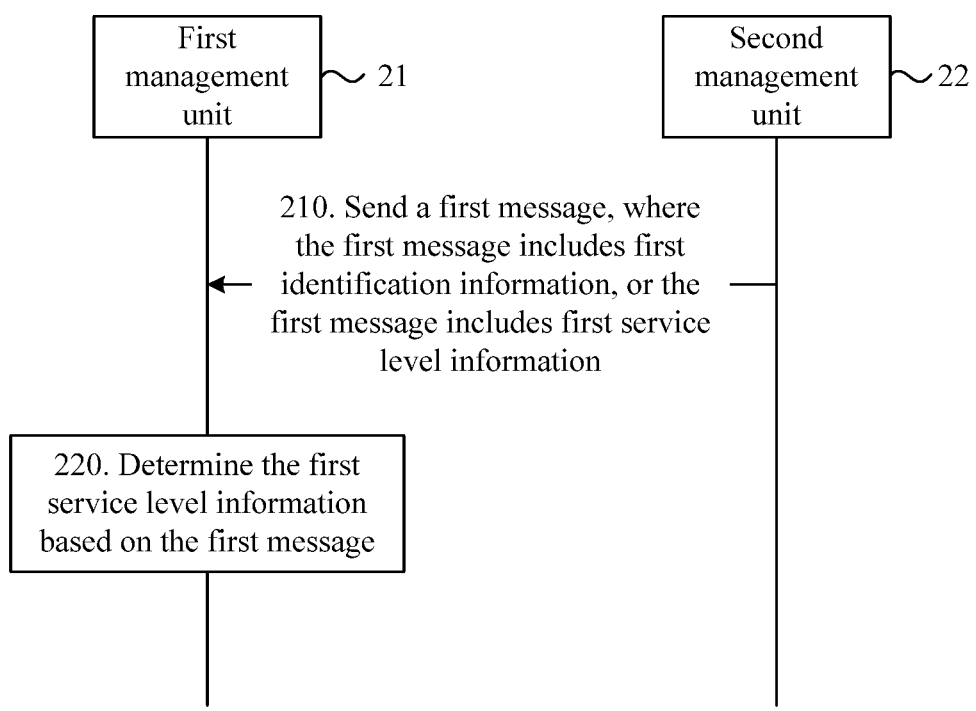
FIG. 2 is a schematic flowchart of a service management method according to an embodiment of this application.

FIG. 2 is an interaction flowchart of a service management method according to an embodiment of this application. The method shown in FIG. 2 is applicable to the NFV system 100 shown in FIG. 1.

210. A first management unit 21 receives a first message sent by a second management unit 22.

Herein, the first message may include first identification information. The first identification information is used to obtain first information. The first information includes information used to obtain first service level information. The first information is a network service NS deployment flavor DF or a virtualized network function VNF deployment flavor DF. Specifically, service level information in the NS DF is used to represent service level information of a network service corresponding to the NS DF, and service level information in the VNF DF is used to represent service level information of a VNF corresponding to the VNF DF.

Specifically, that the first identification information is used to obtain first information may be replaced with the following: The first message may be obtained based on the first information. Specifically, in one embodiment, information identified by the first identification information is the first information. Alternatively, in another embodiment, information identified based on the first identification information is second information, and the first information may be further obtained based on the second information. In other words, the first information may be indirectly obtained based on the first identification information.

In addition, that the first information includes information used to obtain first service level information may be understood as that the first information directly includes the first service level information. Alternatively, the first information includes indication information, and the first service level information may be obtained based on the indication information. In other words, the first service level information may be indirectly obtained based on the first information.

Alternatively, in this embodiment of this application, the first message may include network-service service level information, or the first message includes VNF service level information. Specifically, the network-service service level information or the VNF service level information may be an information element that is newly added to the first message.

220. The first management unit 21 determines the first service level information based on the first message.

In this embodiment of this application, the first management unit receives the first message sent by the second management unit, and then may determine the first service level information based on the first message, so as to cover service level indication information at interfaces between various management network elements in NFV MANO, and further perform differentiated resource allocation and fault recovery for services based on the service level indication information.

In one embodiment, the first message may be used to request an operation of network service instantiation. In an example, the first message may be a network service embodiment request message. In addition, in this case, the first management unit is an NFVO, and the second management unit is an operation support system/business support system.

In one embodiment, a parameter required for the network service instantiation operation requested by the first message is provided by using a network service descriptor (NSD). The NSD includes at least one NS DF. Each of the at least one NS DF is determined based on an identifier. Each of the at least one NS DF includes network service NS service level information.

Specifically, the network service NS service level information may be introduced into an attribute of a network service NS deployment flavor (DF) in the NSD. Therefore, different resource allocation and management can be performed based on different service levels in NS lifecycle management by adding network-service service level information to an NS DF. Specifically, the network-service service level information herein may include at least one of a network-service "service availability level" (SAL) or network service priority indication information.

In one embodiment, when the network-service service level information includes the network-service service priority indication information, the network-service service level indication information may be specifically a network service NS service priority identifier.

In this case, the first message further includes second identification information. The second identification information is used to identify a first correspondence. The first correspondence is specifically a one-to-one correspondence between at least one network service NS priority identifier and at least one network service NS priority level. In a specific example, the first correspondence may be represented by using a table.

In this case, the determining, by the first management unit, the first service level information based on the first identification information and the first information includes: determining, by the first management unit based on the first identification information, the second identification information, and the first information, a network-service service priority level indicated by the first service level information.

Specifically, the first management unit determines the network-service service priority identifier based on the first identification information and the first information. The first service level information includes the network-service service priority identifier.

The first management unit determines, based on the network-service service priority identifier and a first mapping relationship that is corresponding to the second identification information, a network-service service priority level corresponding to the network-service service priority identifier, and uses the network-service service priority level corresponding to the network-service service priority identifier as a network-service service priority level indicated by the first service level information.

Table 1 shows an example of an NS DF provided in an embodiment of this application. An attribute of the NS DF includes an identifier (nsDfId), a flavor keyword (flavourKey), vnfProfile, virtualLinkProfile, scalingAspect, affinityOrAntiAffiniryGroup, a service availability level SAL, and/or a priority identifier. Herein, the service availability level SAL attribute and the priority identifier attribute are network-service service level information, and are attributes newly added based on an existing NS DF definition. Specifically, herein, content in the priority identifier attribute includes network-service service priority indication information. Herein, descriptions are provided by using an example in which the network-service service priority indication information is a network service NS service priority identifier.

or modifications based on the examples given herein, and such variations or modifications shall still fall within the scope of this embodiment of this application. For example, Table 1 may include one of the SAL attribute or the service priority indication information. This is not limited in this embodiment of this application.

TABLE 1

Attributes of an NS DF information element (including newly added attributes)

| Attribute | Qualifier | Cardinality | Content | Description |
|---|---|---|---|---|
| nsDfId | M | 1 | Identifier | Identifying the NsDf information element; and defining an NS DF in an NSD. |
| Flavor keyword (flavourKey) | M | 1 | String | Assurance parameter specific to the described flavor |
| vnfProfile | M | 0 . . . N | VnfProfile | VNF profile used by the NS flavor |
| PnfProfile | M | 0 . . . N | PnfProfile | PNF profile used by the NS flavor |
| virtualLinkProfile | M | 0 . . . N | virtualLinkProfile | VL profile used by the NS flavor Each constituent VNF has a maximum of one profile. |
| scalingAspect | M | 0 . . . N | scalingAspect | Scaling aspects supported by the NS DF |
| Service availability level (SAL) | M | 0 . . . 1 | Enum | Determine one level from the following three levels defined in ETSI GS VNF-REL 001: level 1; level 2; and level 3. The SAL is indication information used to indicate service importance |
| Priority identifier | M | 0 . . . N | Identifier | Network service instance priority identifier |

Table 2 is a table of a correspondence between a network service NS priority identifier and a network service NS priority level provided in an embodiment of this application. One NS DF may be corresponding to N correspondence tables. In other words, each priority identifier may be corresponding to one correspondence table. An attribute of a priority information element defines one of N network service priority levels indicated in a specific NS DF used during network service instantiation.

TABLE 2

Attributes of a priority information element

| Attribute | Qualifier | Cardinality | Content | Description |
|---|---|---|---|---|
| Priority identifier | M | 1 | Identifier | Identifying a priority of the network service instance; and defining a network service instance priority in an NS DF. |
| Priority | M | 1 | Integer | Priority level |

It should be understood that the foregoing Table 1 and Table 2 are merely used as examples, but are not intended to limit a scope of this embodiment of this application. A person skilled in the art may perform equivalent variations In this case, the first identification information in the first message may be a first network service NS instance identifier ID and a first network service deployment flavor identifier NS DF ID. The first NS DF ID is used to identify a first NS DF. A first network service descriptor NSD used for an NS instance identified by the first NS instance ID includes at least the first NS DF.

In other words, in this case, the first identification information (the first NS instance ID and the first NS DF ID) may be used to obtain the first information (the first NS DF). In other words, herein, the first information is the first NS DF. The first NS DF includes the first service level information.

The determining, by the first management unit, the first service level information based on the first identification information and the first information includes: determining, by the first management unit, network-service service level information in the first NS DF as the first service level information based on the first NS instance ID and the first NS DF ID.

Specifically, the first management unit may obtain, based on the first NS instance ID, the first NSD used for instantiation of the first NS instance identified by the first NS instance ID; determine the first NS DF in the first NSD based on the first NS DF ID; obtain the network-service service level information in the first NS DF; and then use the network-service service level information as the first service level information.

Specifically, when the network-service service level information in the first NS DF includes a network-service SAL, the network-service SAL in the first ND DF may be used as the first service level information. This is equivalent to using the network-service SAL in the first NS DF as an SAL of the first network service instance.

When the network-service service level information in the first NS DF includes a network-service service priority identifier, the network-service service priority identifier in the first NS DF may be used as the first service level information. This is equivalent to using the network-service service priority identifier in the first NS DF as a service priority identifier of the first network service instance. Further, a service priority level corresponding to the service priority identifier of the first network service instance may be determined based on the correspondence that is between a network service priority identifier and a network service priority level and that is identified by the second identification information. Further, the service priority level corresponding to the service priority identifier of the first network service instance is used as a network service priority level of the first network service instance.

Therefore, the first network service NS instance identifier ID and the first NS DF ID are carried in the first message, so that the first management unit can determine the first NSD and the first NS DF based on the first message, further determine the network-service service level information in the first NS DF, and further provide, based on service importance, different management for lifecycle management of an NS instance and for a virtual resource associated with the network service instance.

In one embodiment, the method further includes:

determining, by the first management unit, at least one VNF and at least one VL in the first NS instance; and using, by the first management unit, the first service level information as service level information of each of the at least one VNF, and using the first service level information as service level information of each of the at least one VL.

Specifically, the first management unit may obtain, through parsing, the at least one VNF and the at least one VL that are included in the first NS instance. Then the first management unit uses the first service level information as service level information of the at least one VNF, and uses the first service level as service level information of the at least one VL. In this case, the service level information of the at least one VNF is the same as the service level information of the at least one VL, and both are the network-service service level information in the first NS DF.

Specifically, when the network-service service level information in the first NS DF includes the network-service service availability level SAL, the service level information of the at least one VNF and the at least one VL in the first NS instance is equivalent to the SAL of the first network service instance. In other words, SALs of the at least one VNF and the at least one VL are the same as an SAL in the first NS DF.

When the network-service service level information in the first NS DF includes the network-service service priority indication information (service priority identifier), service priority levels of the at least one VNF and the at least one VL in the first NS instance are equivalent to a network-service service priority level in the first NS DF.

Therefore, different resource allocation and management can be performed in a lifecycle of an NS or a VNF based on different service levels and based on VNF service level information and VL service level information.

In another embodiment, a parameter required for the network service instantiation operation requested by the first message is provided by using a network service descriptor NSD. The network service descriptor NSD includes at least one network service deployment flavor NS DF. Each of the at least one NS DF is determined based on an identifier. Each of the at least one NS DF includes at least one virtualized network function profile VNF profile. Each of the at least one virtualized network function profile VNF profile includes one virtualized network function descriptor VNFD and one virtualized network function deployment flavor VNF DF. The virtualized network function descriptor VNFD includes at least one virtualized network function deployment flavor VNF DF. The virtualized network function deployment flavor VNF DF includes virtualized network function service level information. The virtualized network function profile VNF profile is represented by using a VNF profile ID in the NS DF. The VNFD is represented by using a VNFD ID in the VNF profile. The VNF DF is represented by using a VNF DF ID in the VNF profile and the VNFD.

Specifically, herein, for the NSD, the NS DF, and the VNF profile, refer to descriptions in the prior art. Details are not described herein.

In this embodiment of this application, the VNF service level information may be introduced into an attribute of a VNF deployment flavor (DF) in the virtualized network function descriptor (VNFD). Therefore, different resource allocation and management can be performed based on different service levels in NS and VNF lifecycle management by adding network-service service level information to a VNF DF.

Specifically, the VNF service level information may include at least one of a VNF "service availability level" (SAL) value or VNF priority indication information.

In one embodiment, when the VNF service level information includes the VNF service priority indication information, the VNF service level indication information may be specifically a VNF service priority identifier.

In this case, the first message further includes third identification information. The third identification information is used to identify a second correspondence. The second correspondence is specifically a one-to-one correspondence between at least one VNF priority identifier and at least one VNF priority level. In a specific example, the second correspondence may be represented by using a table.

In this case, the determining, by the first management unit, the first service level information based on the first identification information and the first information includes:

determining, by the first management unit based on the first identification information, the third identification information, and the first information, a VNF service priority level indicated by the first service level information.

Specifically, the first management unit determines the VNF service priority identifier based on the first identification information and the first information. The first service level information includes the VNF service priority identifier.

The first management unit determines, based on the VNF service priority identifier and a second mapping relationship corresponding to the third identification information, a VNF service priority level corresponding to the VNF service priority identifier, and uses the VNF service priority level corresponding to the VNF service priority identifier as a VNF service priority level indicated by the first service level information.

Table 3 shows an example of a VNF DF provided in an embodiment of this application. An attribute of the VNF DF includes a flavor identifier (flavourId), a description, vduProfile, virtualLinkProfile, a service availability level SAL, and a priority identifier. Herein, the service availability level SAL attribute and the priority identifier attribute are VNF service level information, and are attributes newly added based on an existing VNF DF definition. Specifically, herein, content in the priority identifier attribute includes VNF service priority indication information. Herein, descriptions are provided by using an example in which the VNF service priority indication information is a VNF service priority identifier.

Table 3

Attributes of a VNF DF information element (including newly added attributes)

| Attribute | Qualifier | Cardinality | Content | Description |
|---|---|---|---|---|
| flavourId | M | 1 | Identifier | Identifier of the DF in a VNFD |
| Description | M | 1 | String | Description of the DF |
| vduProfile | M | 1 ... N | vduProfile | VDUs used in the flavor |
| virtualLinkProfile | M | 0 ... N | virtualLinkProfile | Defining an internal VLD and additional data used for the DF. See annotations 1 and 2. |
| Service availability level (SAL) | M | 0 ... 1 | Enum | Determine one level from the following three levels defined in ETSI GS VNF-REL 001: level 1; level 2; and level 3. The SAL is indication information used to indicate service importance. |
| Priority identifier | M | 0 ... N | Identifier | VNF instance priority identifier |

Table 4 is a table of a correspondence between a VNF priority identifier and a VNF priority level provided in an embodiment of this application. One VNF DF may be corresponding to N correspondence tables. In other words, each priority identifier may be corresponding to one correspondence table. An attribute of a priority information element defines one of N VNF priority levels indicated in a specific VNF DF used during VNF instantiation.

TABLE 4

Attributes of a priority information element

| Attribute | Qualifier | Cardinality | Content | Description |
|---|---|---|---|---|
| Priority identifier | M | 1 | Identifier | Identifying a priority of the VNF instance; and defining a VNF instance priority in a VNF DF. |
| Priority | M | 1 | Integer | Priority level |

It should be understood that the foregoing Table 3 and Table 4 are merely used as examples, but are not intended to limit a scope of this embodiment of this application. A person skilled in the art may perform equivalent variations or modifications based on the examples given herein, and such variations or modifications shall still fall within the scope of this embodiment of this application. For example, Table 3 may include one of the SAL or a priority. This is not limited in this embodiment of this application.

In this case, the first identification information is a second NS instance ID and a second NS DF ID. The second NS DF ID is used to identify a second NS DF. A second NSD used for instantiation of a second NS instance identified by the second NS instance ID includes at least the second NS DF. The second NS DF includes at least one first virtualized network function profile VNF profile. Each of the first virtualized network function profile VNF profile includes a first virtualized network function descriptor identifier VNFD ID and a first virtualized network function deployment flavor identifier VNF DF ID. The first VNF DF ID is used to identify a first VNF DF. The first VNFD includes at least the first VNF DF.

In other words, in this case, the first identification information (the second NS instance ID and the second NS DF ID) may be used to obtain the first information (the second NS DF). In other words, herein, the first information is the second NS DF. The second NS DF includes information (namely, the first VNF DF) used to obtain a first service level. Further, the first VNF DF includes the first service level information.

The determining, by the first management unit, the first service level information based on the first identification information and the first information includes:

determining, by the first management unit, the second NS DF based on the second NS instance ID and the second NS DF ID; and determining, by the first management unit based on an identifier of each of the at least one first virtualized network function profile VNF profile in the second NS DF, each first VNFD ID and each first VNF DF ID that are included in each first virtualized network function profile VNF profile, and using virtualized network function service level information in each first VNF DF as the first service level information.

Specifically, the first management unit may obtain, based on the second NS instance ID, the second NSD used for instantiation of the second NS instance identified by the second NS instance ID; determine the second NS DF in the second NSD based on the second NS DF ID; obtain the identifier of each of the at least one first VNF profile in the second NS DF; determine each first VNF profile; further obtain a first VNFD ID and a first VNF DF ID that are included in each first VNF profile; and then obtain the VNF DF in the first VNFD based on the first VNFD ID and the first VNF DF ID in the first VNF profile, and use the virtualized network function service level information in the first VNF DF as the first service level information.

In this case, the second NS DF includes the at least one first VNF profile. One first VNFD ID and one first VNF DF ID may be determined based on each first VNF profile. Therefore, in this embodiment of this application, at least one first VNF DF may be obtained based on the second ND DF. In this case, the first service level information includes VNF service level information in each of the at least one first VNF DF.

In addition, the VNF service level information in each of the at least one first VNF DF may be the same or may be different. This is not limited in this embodiment of this application.

Specifically, when the VNF service level information in the first VNF DF includes a VNF service availability level SAL, a VNF SAL in the at least one first VNF DF may be used as the first service level information.

When the VNF service level information in the first VNF DF includes a VNF service priority identifier, a VNF service priority identifier in the at least one first VNF DF may be used as the first service level information. Further, a VNF service priority level corresponding to a VNF service priority identifier in each of the at least one first VNF DF may be determined based on the correspondence that is between a VNF priority identifier and a VNF priority level and that is identified by the third identification information.

Therefore, the second network service NS instance identifier ID and the second NS DF ID are carried in the first message, so that the first management unit can determine the second NS DF and the at least one first VNF DF based on the first message, further determine VNF service level information in the at least one first VNF DF, and further provide, based on service importance, different management for lifecycle management of an NS instance and a VNF instance and for virtual resources associated with the NS instance and the VNF instance.

In one embodiment, the first message may be used to request an operation of virtualized network function instantiation. For example, the first message may be a network service NS update message or a VNF instantiation request. Specifically, when the first message is the network service update message, the first management unit is an NFVO, and the second management unit is an operation support system/business support system. When the first message is the VNF instantiation request, the first management unit is a VNFM and the second management unit is an EM, or the first management unit is a VNFM and the second management unit is an NFVO.

In this embodiment of this application, a parameter required for the virtualized network function instantiation operation requested by the first message is provided by using a virtualized network function descriptor VNFD. The virtualized network function descriptor VNFD includes at least one virtualized network function deployment flavor VNF DF. Each of the at least one VNF DF includes one piece of virtualized network function service level information. Specifically, for the VNF DF, refer to the foregoing descriptions and the descriptions in Table 3. To avoid repetition, details are not described herein again. In addition, for the VNF service level information, refer to the foregoing descriptions and the descriptions in Table 4. To avoid repetition, details are not described herein again.

Therefore, different resource allocation and management can be performed based on different service levels in VNF lifecycle management by adding network-service service level information to a VNF DF.

In one embodiment, when the first message is a VNF instantiation request message, the first identification information is a second VNF instance ID and a second VNF DF ID. The second VNF DF ID is used to identify a second VNF DF. A second virtualized network function descriptor VNFD used for instantiation of a VNF instance identified by the second VNF instance ID includes at least the second VNF DF.

In other words, in this case, the first identification information (the second VNF instance ID and the second VNF DF ID) may be used to obtain the first information (the second VNF DF). In other words, herein, the first information is the second VNF DF. The second VNF DF includes the first service level information.

The determining, by the first management unit, the first service level information based on the first identification information and the first information includes:
using, by the first management unit, virtualized network function service level information in the second VNF DF as the first service level information based on the second VNF instance ID and the second VNF DF ID.

Specifically, the first management unit may obtain, based on the second VNF instance ID, the second VNFD used for instantiation of the second VNF instance identified by the second VNF instance ID; determine the second VNF DF in the second VNFD based on the second VNF DF ID; obtain the VNF service level information in the second VNF DF; and then use the VNF service level information as the first service level information.

Specifically, when the VNF service level information in the second VNF DF includes a VNF service availability level SAL, the VNF SAL in the second VNF DF may be used as the first service level information.

When the VNF service level information in the second VNF DF includes a VNF service priority identifier, the VNF service priority identifier in the second VNF DF may be used as the first service level information. Further, a VNF service priority level corresponding to the VNF service priority identifier in the second VNF DF may be determined based on the correspondence that is between a VNF priority identifier and a VNF priority level and that is identified by the third identification information.

Therefore, the second VNF instance identifier ID and the second VNF DF ID are carried in the first message, so that the first management unit can determine the second VNFD and the second VNF DF based on the first message, further determine the VNF service level information in the second VNF DF, and further provide, based on service importance, different management for lifecycle management of a VNF instance and for a virtual resource associated with the VNF instance.

In one embodiment, when the first message is an NS update request, the first identification information is a third NS instance ID that needs to be updated. The first message further includes information about at least one instantiated VNF. A third NS instance identified by the third NS instance ID includes the information about the at least one instantiated VNF. Each piece of the information about the at least one instantiated VNF includes the third VNFD ID and a third VNF DF ID. A third virtualized network function descriptor VNFD used for instantiation of a VNF instance identified by the third VNF instance ID includes at least the third VNF DF.

In other words, in this case, the first identification information (the third NS instance ID) and the information about the at least one instantiated VNF may be used to obtain the first information (at least one third VNF DF). In other words, herein, the first information is the third VNF DF, and the third VNF DF includes the first service level information.

The determining, by the first management unit, the first service level information based on the first identification information and the first information includes:

using, by the first management unit, virtualized network function service level information in the third VNF DF as the first service level information based on the third NS instance ID and the information about the at least one instantiated VNF.

In this case, one third VNFD ID and one third VNF DF ID may be determined based on information about each instantiated VNF. Therefore, in this embodiment of this application, the at least one third VNF DF may be determined based on the third NS instance ID and the information about the at least one instantiated VNF. In this case, the first service level information includes VNF service level information in each of the at least one third VNF DF.

In addition, the VNF service level information in each of the at least one third VNF DF may be the same or may be different. This is not limited in this embodiment of this application.

Specifically, when the VNF service level information in the third VNF DF includes a VNF service availability level SAL, a VNF SAL in the at least one third VNF DF may be used as the first service level information.

When the VNF service level information in the third VNF DF includes a VNF service priority identifier, a VNF service priority identifier in the at least one third VNF DF may be used as the first service level information. Further, a VNF service priority level corresponding to a VNF service priority identifier in each of the at least one third VNF DF may be determined based on the correspondence that is between a VNF priority identifier and a VNF priority level and that is identified by the third identification information.

Therefore, the third VNF instance identifier ID that needs to be updated and the information about the at least one instantiated VNF are carried in the first message, so that the first management unit can determine the third VNFD and the at least one third VNF DF based on the first message, further determine VNF service level information in the at least one third VNF DF, and further provide, based on service importance, different management for lifecycle management of a VNF instance and for a virtual resource associated with the VNF instance.

In one embodiment, when the first service level information is the network-service service level information, after the operation requested by the first message is successfully completed, the method further includes:

recording, by the first management unit, the network-service service level information in an attribute of network service level indication information in a network service information element database, where the network service information element is used to record real-time status information of a network service instance, and the real-time status information of the network service instance includes the network-service service level information.

Specifically, the network service information element (Nsinfo information elements) provides real-time information of the network service instance. At least one of a new network-service "service availability level" (SAL) attribute or a new network-service service priority level attribute is introduced into the information element, to describe the real-time status information of the network service instance. Herein, an initial value of the SAL attribute or the service priority level is input based on a parameter used for instantiation of a network service. Table 5 shows an example of an SAL attribute or a service priority level attribute newly added to an NS information element provided in an embodiment of this application.

TABLE 5

| Attribute | Qualifier | Cardinality | Content | Description |
| --- | --- | --- | --- | --- |
| NS service availability level (SAL) | M | 0 . . . 1 | Enum | SAL value of an instantiated NS instance. The value may be set for an NS instance (for example, including an NS DF), or the value may be modified into that in an annotation 1. |
| Priority | M | 0 . . . 1 | Priority level | Network service instance priority |

In one embodiment, the method further includes:

receiving, by the first management unit, a second message, where the second message is used to modify the network-service service level information in the network service information element, and the second message includes indication information of second service level information; and replacing, by the first management unit, the network-service service level information in the network service information element with the second service level information.

Specifically, during real-time running of a network service instance, if a service provider considers that the value cannot reflect actually required service importance, the service provider may modify the SAL attribute value or a service priority level by using an instruction, and select a new network service deployment flavor corresponding to a service priority level identifier that is corresponding to this new SAL value or new service priority level. The NFV system can correspondingly adjust, based on adjustment of a corresponding SAL or priority indication information, a management policy for a virtualized resource associated with a service.

In this embodiment of this application, service level information in an NS deployment flavor is dynamically changed, so that a management unit can provide dynamic management for lifecycle management of the network service instance and for a virtual resource associated with the network service instance.

In one embodiment, when the first service level information is the VNF service level information, after the operation requested by the first message is successfully completed, the method further includes:

recording, by the first management unit, the VNF service level information in an attribute of VNF indication information in a VNF information element database, where the VNF information element is used to record real-time status information of a VNF instance, and the real-time status information of the VNF instance includes the VNF service level information.

Specifically, the virtualized network function information element (VNF information elements) provides real-time information of the virtualized network function instance. At least one of a new VNF "service availability level" (SAL) attribute or a new VNF service priority level attribute is introduced into the information element, to describe the real-time status information of the virtualized network function instance. Herein, an initial value of the SAL attribute or the service priority level attribute is input based on a parameter used for instantiation of a virtualized network function. Table 6 shows an example of an SAL attribute or a service priority level attribute newly added to a VNF information element provided in an embodiment of this application.

TABLE 6

| Attribute | Qualifier | Cardinality | Content | Description |
| --- | --- | --- | --- | --- |
| Service availability level (SAL) | M | 0 . . . 1 | Enum | SAL value of an instantiated VNF instance. The value may be set for a VNF instance (for example, including a VNF DF), or the value may be modified into that in an annotation 1. |
| Priority | M | 0 . . . 1 | Priority level | VNF instance priority level |

In one embodiment, the method further includes:

receiving, by the first management unit, a third message, where the third message is used to modify the VNF service level information in the VNF information element, and the second message includes indication information of third service level information; and replacing, by the first management unit, the VNF service level information in the VNF information element with the third service level information.

Specifically, during real-time running of a virtualized network function instance, if a service provider considers that the value cannot reflect service availability corresponding to an actually required degree of service importance, the service provider service provider modifies the SAL attribute value or a service priority level by using an instruction, and selects a new VNF deployment flavor corresponding to a service priority level identifier that is corresponding to this new SAL value or new service priority level. The NFV system can correspondingly adjust, based on adjustment of a corresponding SAL or service priority level, a management policy for a virtualized resource associated with a service.

In one embodiment, the method further includes:

sending, by the first management unit, a fourth message to a third management unit, where the fourth message includes the virtualized network function VNF service level information, the virtualized network function VNF service level information is used to perform resource management or allocation on a virtual resource required for a virtualized network function VNF instance, and the virtual resource includes at least one of a virtual computing resource, a virtual storage resource, or a virtual network resource.

In this embodiment of this application, service level information in a VNF deployment flavor is dynamically changed, so that a management unit can provide dynamic management for lifecycle management of the VNF instance and for a virtual resource associated with the VNF instance.

In one embodiment, the first management unit is an NFVO or a VNFM, and the third management unit is a VIM. In this case, the fourth message is a virtualized-resource allocation request message, a virtualized-resource migration request message, a virtualized-resource extension request message, or a virtualized-resource creation and reservation request message.

In this embodiment of this application, the first management unit receives the first message sent by the second management unit, and then may determine the first service level information based on the first message, so as to cover service level indication information at interfaces between various management network elements in NFV MANO, and further perform differentiated resource allocation and fault recovery for services based on the service level indication information.

The following describes in detail a service management method in the embodiments of this application with reference to specific examples of FIG. 3A and FIG. 3B, FIG. 4A and FIG. 4B, and FIG. 5A and FIG. 5B. It should be noted that, the following examples are merely intended to help a person skilled in the art understand and implement the embodiments of this application, but not to limit the scope of the embodiments of this application. A person skilled in the art may perform equivalent variations or modifications based on the examples given herein, and such variations or modifications shall still fall within the scope of the embodiments of this application.

Figure 3A:
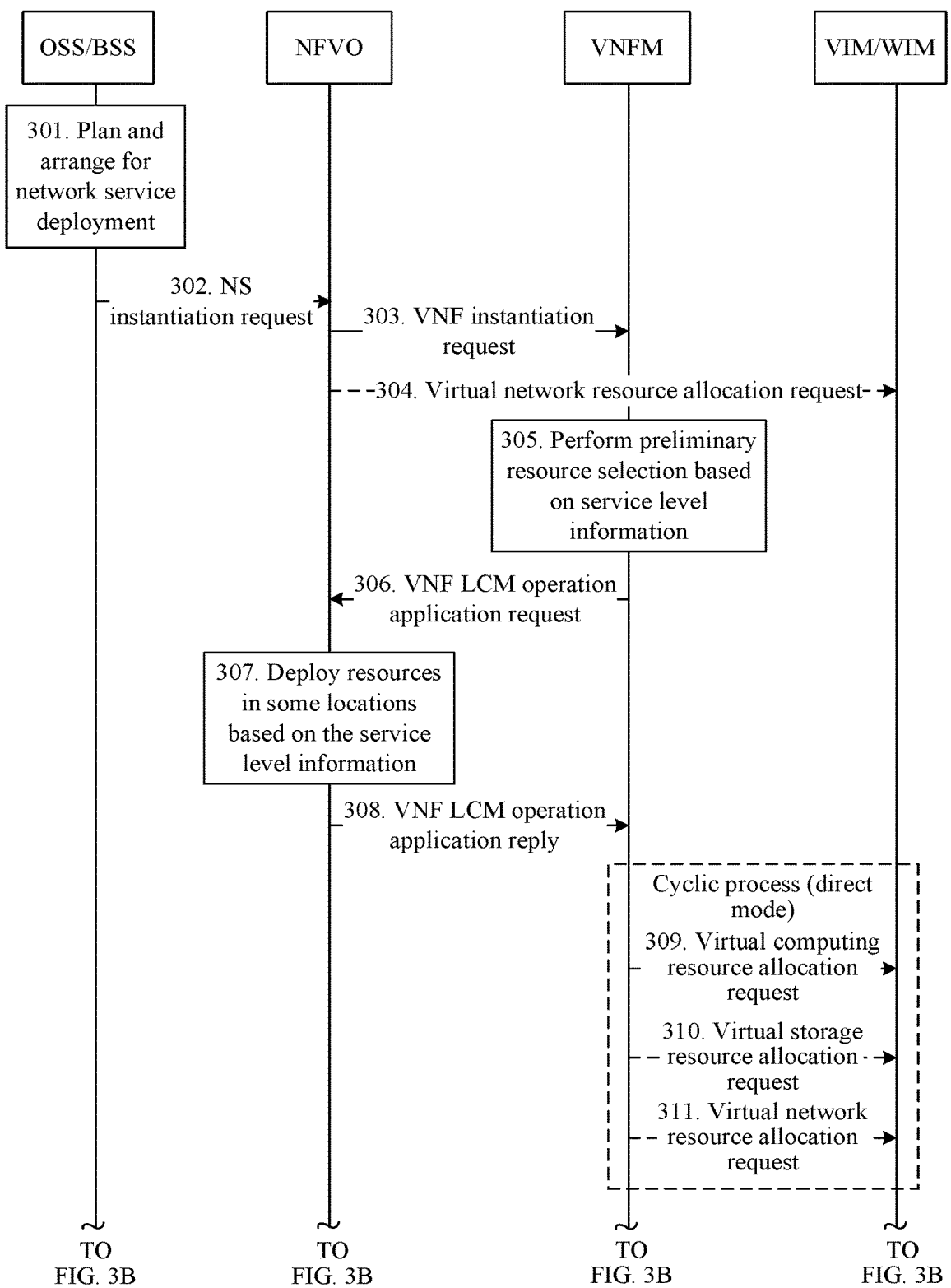
FIG. 3A and FIG. 3B show a specific example of a service management method according to an embodiment of this application.
Figure 3B:
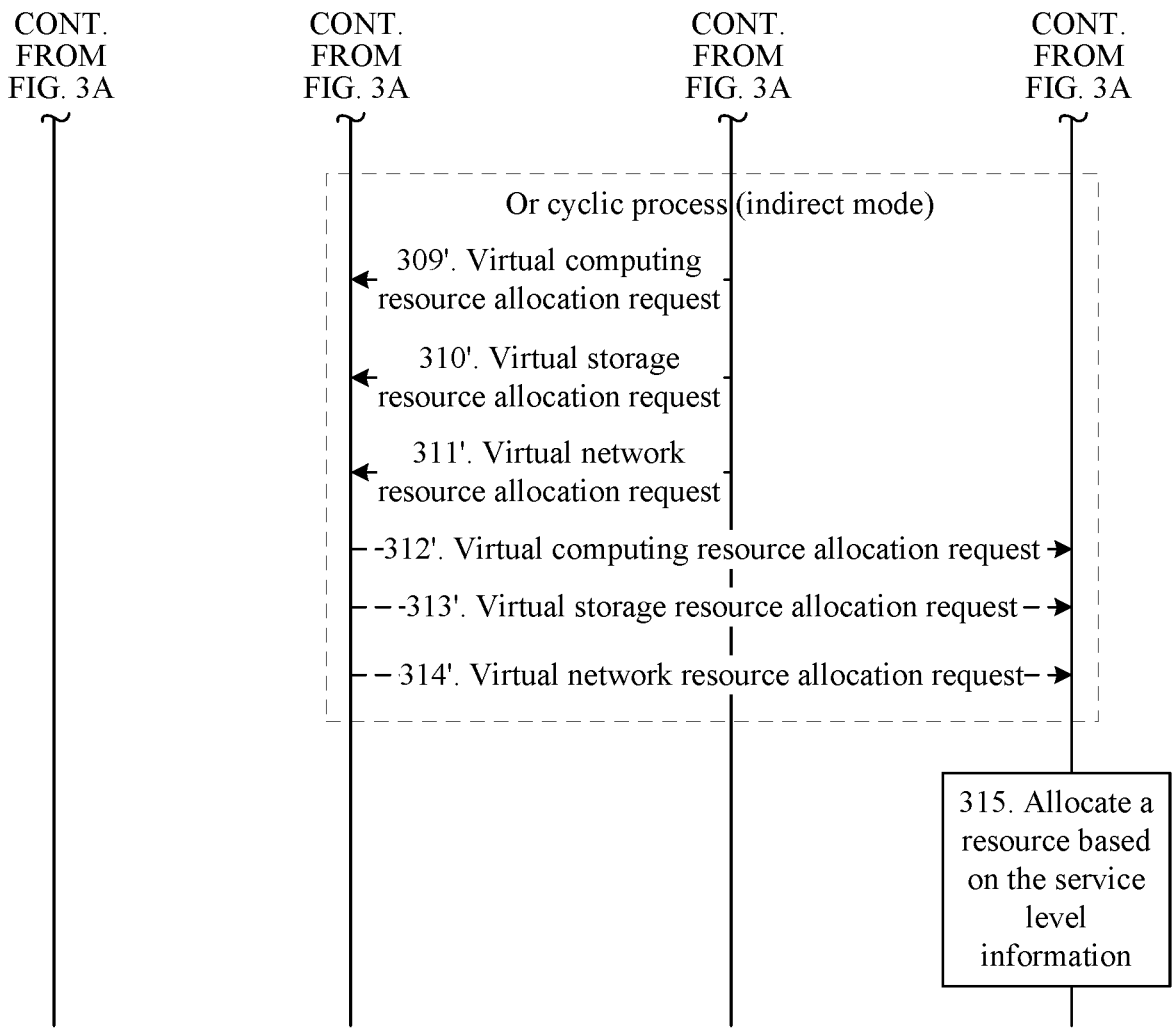

FIG. 3A and FIG. 3B are a schematic flowchart of a service management method according to an embodiment of this application. It should be understood that FIG. 3A and FIG. 3B show operations of a service processing method; however, the operations are merely examples, and other operations or variations of the operations in FIG. 3A and FIG. 3B may be further performed in this embodiment of this application. In addition, the operations in FIG. 3A and FIG. 3B may be performed in a sequence different from that shown in FIG. 3A and FIG. 3B, and some operations in FIG. 3A and FIG. 3B may not need to be performed.

301. An OSS/BSS plans and arranges for network service deployment.

A service provider may select and deploy appropriate service level information for a network service based on a degree of importance of a service carried on the network service.

302. The OSS/BSS sends an NS instantiation request to an NFVO.

In this case, the NS instantiation request includes an NS instance identifier ID and a network service deployment flavor identifier. When receiving the NS instantiation request, the NFVO obtains, through parsing, the service level information selected and deployed by the OSS/BSS for the network service.

In an example, when a network service deployment flavor NS DF includes network-service service level information, the OSS/BSS may select, from a network service deployment flavor NS DF set in a network service descriptor NSD based on the service level information and another network service instantiation parameter, an NS DF ID of a network-service deployment flavor NS DF corresponding to the service level information, and use the NS DF ID as an NS DF ID for network service instantiation.

For example, when an SAL value selected and deployed by the service provider for the network service is a first SAL value, the OSS/BSS selects, from the NS DF set in the NSD, an NS DF ID of an NS DF corresponding to the first SAL value, and uses the NS DF ID as the NS DF ID for network service instantiation.

For another example, when a network-service service priority level selected and deployed by the service provider for the network service is a first level, and an identifier corresponding to the first level is a first identifier, the OSS/BSS selects, from the NS DF set in the NSD, an NS DF ID of an NS DF corresponding to the first identifier, and uses the NS DF ID as the NS DF ID for network service instantiation.

After the OSS/BSS sends the NS instantiation request to the NFVO, the NFVO may determine, based on the NS instance ID in the NS instantiation request, an NS instance identified by the NS instance ID, and further determine information about an NSD used for instantiation of the NS instance. In this way, the NFVO can determine, in the NSD based on the network service deployment flavor identifier in the NS instantiation request, a network service deployment flavor identified by the network service deployment flavor identifier, and further obtain, based on the network service deployment flavor, the NS service level information deployed by the OSS/BSS.

In another example, a virtualized network function VNF DF includes VNF service level information, and a virtual link VL DF includes VL service level information. In this case, the OSS/BSS may determine a series of constituent elements of the network service: virtualized network functions (VNFs) and virtual links (VLs). Then the OSS/BSS selects and deploys appropriate service level information for all the VNFs and the VLs (the service level information of the VNFs and the VLs may be the same or be different). Then the OSS/BSS selects, from a VNF deployment flavor set in a VNFD based on the service level information, a parameter required for instantiation of each VNF, and a parameter of each VL, a VNF DF corresponding to the service level information; determines a VNF DF ID of the VNF DF; selects, from a VL deployment flavor DF set in a virtual link descriptor VLD, a VL DF corresponding to the service level information; and determines a VL DF identifier ID of the VLD. In this way, one or more virtualized network function profiles (VNF profile) including one or more VNF deployment flavor identifiers and other parameters, and one or more virtual link profiles (VL profile) including one or more VL deployment flavor identifiers and other parameters can be obtained based on the series of constituent elements of the network service. The virtualized network function profiles (VNF profile), the virtual link profiles (VL profile), and the other parameters may be used to constitute a network service deployment flavor NS DF used for instantiation of a corresponding network service NS. Herein, the network service deployment flavor NS DF has a network service deployment flavor identifier NS DF ID.

For example, when an SAL value selected and deployed by the service provider for a VNF or a VL is a second SAL value, the OSS/BSS selects, from the VNF DF set in the VNFD, a VNF DF ID of a VNF DF corresponding to the second SAL value, and selects, from the VL DF set in the VLD, a VL DF ID of a VL DF corresponding to the second SAL value. In this way, the OSS/BSS can further obtain one or more VNF profiles including one or more VNF deployment flavor identifiers and other parameters, and one or more VL profiles including one or more VL deployment flavor identifiers and other parameters. The VNF profiles, the VL profiles, and the other parameters may be used to constitute a network service deployment flavor NS DF used for instantiation of a corresponding NS.

For another example, when a network-service service priority level selected and deployed by the service provider for the network service is a first level, and an identifier corresponding to the first level is a first identifier, the OSS/BSS selects, from the NS DF set in the NSD, an NS DF ID of an NS DF corresponding to the first identifier, and uses the NS DF ID as the NS DF ID for network service instantiation.

For another example, when a network-service service priority level selected and deployed by the service provider for a VNF or a VL is a second level, and an identifier corresponding to the second level is a second identifier, the OSS/BSS selects, from the VNF DF set in the VNFD, a VNF DF ID of a VNF DF corresponding to the second identifier, and selects, from the VD DF set in the VLD, a VL DF ID of a VL DF corresponding to the second identifier. In this way, the OSS/BSS can further obtain one or more VNF profiles including one or more VNF deployment flavor identifiers and other parameters, and one or more VL profiles including one or more VL deployment flavor identifiers and other parameters. The VNF profiles, the VL profiles, and the other parameters may be used to constitute a network service deployment flavor NS DF used for instantiation of a corresponding NS.

After the OSS/BSS sends the NS instantiation request to the NFVO, the NFVO may determine, based on the NS instance ID in the NS instantiation request, an NS instance identified by the NS instance ID, and further determine information about an NSD used for instantiation of the NS instance. In this way, the NFVO can determine, in the NSD based on the network service deployment flavor identifier in the NS instantiation request, a network service deployment flavor identified by the network service deployment flavor identifier, and further determine, based on the network service deployment flavor, the one or more VNF profiles, the one or more VL profiles, and the other parameters. Further, a VNF DF may be determined based on a VNFD ID and a VNF DF ID in the VNF profile, and VNF service level information included in the VNF DF may be further determined; a VL DF may be determined based on a VLD ID and a VL DF ID in the VL profile, and VL service level information included in the VL DF may be further determined.

Specifically, for the NS instantiation request herein, refer to the descriptions in FIG. 2. To avoid repetition, details are not described herein again.

303. The NFVO sends a VNF instantiation request to a VNFM.

Specifically, when the network service deployment flavor NS DF includes the network-service service level information, the NFVO obtains, through parsing, the network service NS service level information after receiving a VNF instantiation request message; and then obtains, through mapping, corresponding virtualized network function VNF service level information and virtual link VL service level information based on the series of constituent elements of the network service: the virtualized network functions (VNFs) and the virtual links (VL).

Herein, the VNF instantiation request includes a VNF instance identifier ID and a VNF deployment flavor identifier. When receiving the VNF instantiation request, the NFVM obtains, through parsing, the VNF service level information.

Specifically, the VNFM may determine, based on the VNF instance ID in the VNF instantiation request, a VNF instance identified by the VNF instance ID, and further determine information about a VNFD used for instantiation of the VNF instance. In this way, the VMFM can determine, in the VNFD based on the VNF deployment flavor identifier in the VNF instantiation request, a VNF deployment flavor identified by the VNF deployment flavor identifier, and further obtain service level information of the VNF instance based on the VNF deployment flavor.

Specifically, for the VNF instantiation request herein, refer to the descriptions in FIG. 2. To avoid repetition, details are not described herein again.

304. The NFVO sends a virtual network resource allocation request to a VIM/WIM.

Specifically, when the NFVO sends the virtual network resource allocation request to the VIM/WIM, the NFVO sends, in the request message, the VL service level information and another parameter.

Specifically, for the virtual network resource allocation request, refer to the foregoing descriptions. To avoid repetition, details are not described herein again.

305. The VNFM performs preliminary resource selection based on service level information.

Specifically, the VNFM obtains, from the VNF instantiation request through parsing, service level information of a VNF that needs to be instantiated; and then performs preliminary resource selection based on the service level information of the VNF and according to an affinity/anti-affinity rule.

306. The VNFM sends a GrantVnfLifecycleOperation (Grant Vnf Lifecycle, LCM) request to the NFVO, and the VNFM sends, in the request message, service level information of a VNF and an internal VL and other parameters.

307. The NFVO deploys resources in some locations (a data center) based on the service level information and according to an affinity/anti-affinity rule, and if the resources are insufficient, performs resource adjustment based on the service level information and according to a resource management policy.

308. The NFVO sends a VNF LCM operation application reply to the VNFM.

309. The VNFM sends a virtual computing resource allocation request to the VIM/WIM.

310. The VNFM sends a virtual storage resource allocation request to the VIM/WIM.

311. The VNFM sends a virtual network resource allocation request to the VIM/WIM.

Operations 309 to 311 are a direct-mode cyclic process.

309'. The VNFM sends a virtual computing resource allocation request to the NFVO.

310'. The VNFM sends a virtual storage resource allocation request to the NFVO.

311'. The VNFM sends a virtual network resource allocation request to the NFVO.

312'. The NFVO sends a virtual computing resource allocation request to the VIM/WIM.

313'. The NFVO sends a virtual storage resource allocation request to the VIM/WIM.

314'. The NFVO sends a virtual network resource allocation request to the VIM/WIM.

Operations 309' to 314' are an indirect-mode cyclic process.

Specifically, for the virtual computing resource allocation request, the virtual storage resource allocation request, and the virtual network resource allocation request, refer to the foregoing descriptions. To avoid repetition, details are not described herein again.

315. The VIM/WIM allocates a resource based on the service level information.

In this way, the NFV system modules (the NFVO, the VNFM, and the VIM or the WIM) can implement, based on a requirement implied in service level information, differentiated allocation, management, and provisioning for virtualized resources used by different network services, so as to meet virtualized-resource availability requirements of the different network services.

Figure 4A:
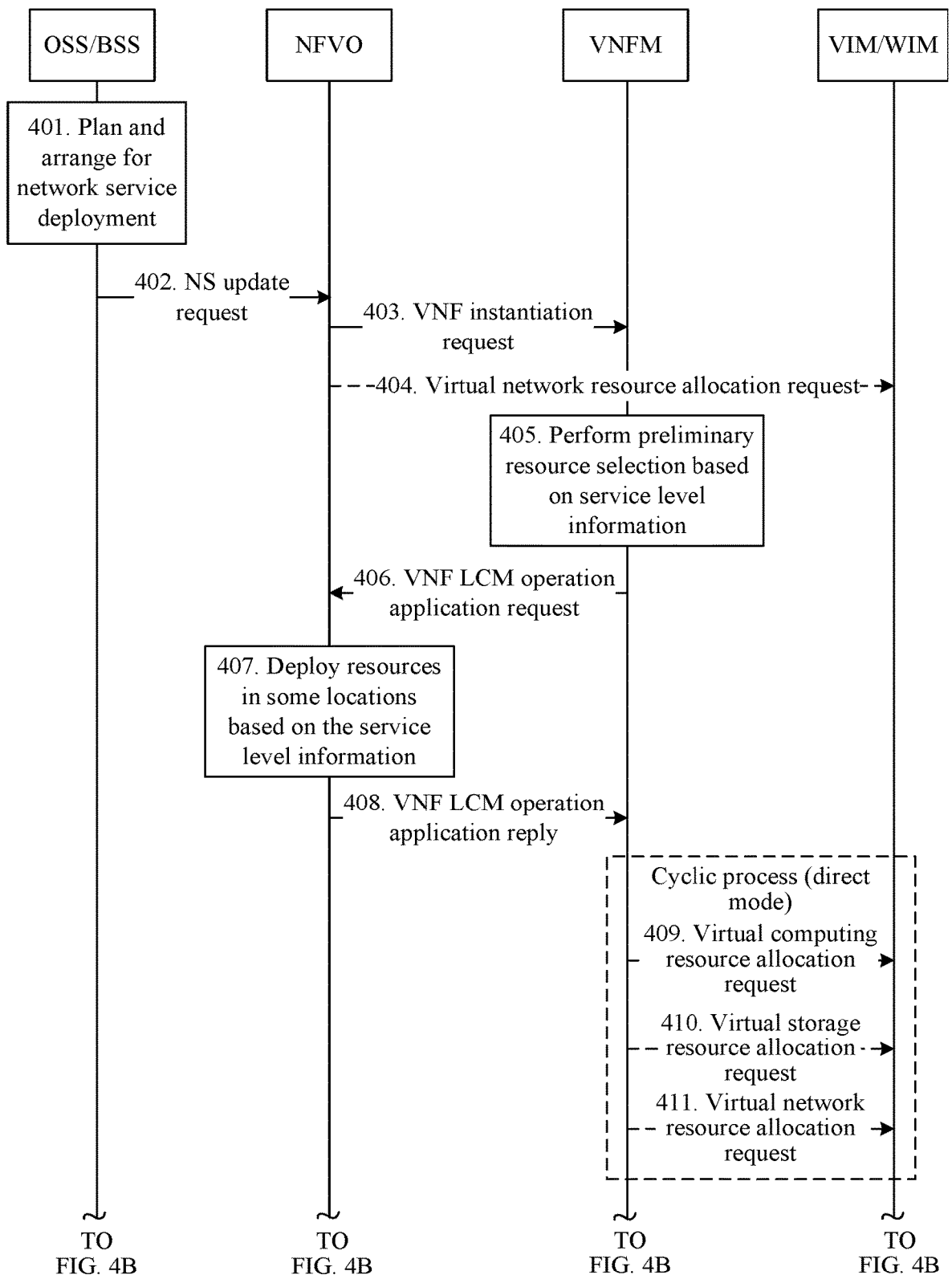
FIG. 4A and FIG. 4B show a specific example of another service management method according to an embodiment of this application.
Figure 4B:
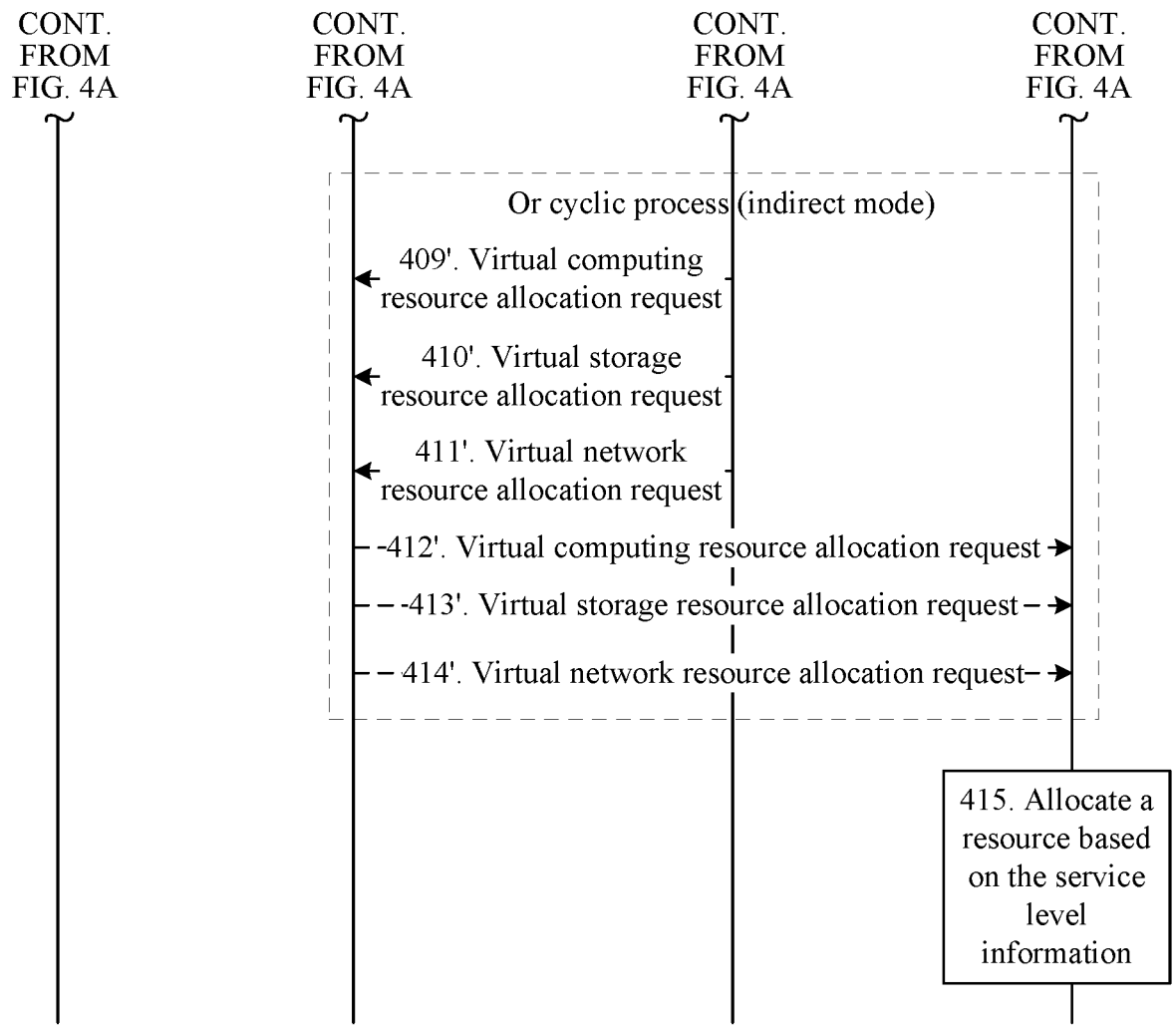

FIG. 4A and FIG. 4B are a schematic flowchart of a service management method provided in an embodiment of this application. It should be understood that FIG. 4A and FIG. 4B show operations of a service processing method; however, the operations are merely examples, and other operations or variations of the operations in FIG. 4A and FIG. 4B may be further performed in this embodiment of this application. In addition, the operations in FIG. 4A and FIG. 4B may be performed in a sequence different from that shown in FIG. 4A and FIG. 4B, and some operations in FIG. 4A and FIG. 4B may not need to be performed.

401. An OSS/BSS plans and arranges for network service deployment.

A service provider may select and deploy appropriate service level information for a VNF based on a degree of importance of a service carried on the VNF.

In an example, when a VNF deployment flavor VNF DF includes VNF service level information, the OSS/BSS may select, from a VNF deployment flavor VNF DF set in a VNF descriptor VNFD based on the service level information and another VNF instantiation parameter, a VNF DF ID of a VNF deployment flavor VNF DF corresponding to the service level information, and use the VNF DF ID as a VNF DF ID for VNF instantiation.

For example, when an SAL value selected and deployed by the service provider for the VNF is a third SAL value, the OSS/BSS selects, from the VNF DF set in the VNFD, a VNF DF ID of a VNF DF corresponding to the third SAL value, and uses the VNF DF ID as the VNF DF ID for VNF instantiation.

For another example, when a VNF service priority level selected and deployed by the service provider for the VNF is a third level, and an identifier corresponding to the third level is a third identifier, the OSS/BSS selects, from the VNF DF set in the VNFD, a VNF DF ID of a VNF DF corresponding to the third identifier, and uses the VNF DF ID as the VNF DF ID for VNF instantiation.

402. The OSS/BSS sends an NS update request to an NFVO.

In this case, the NS update request includes an NS instance identifier ID that needs to be updated and information about at least one instantiated VNF. When receiving the NS instantiation update request, the NFVO obtains, through parsing, the service level information selected and deployed by the OSS/BSS for the VNF.

Specifically, after the OSS/BSS sends the NS update request to the NFVO, the NFVO may determine, based on the NS instance ID in the NS update request, an NS instance identified by the NS instance ID, and further determine information about an NSD used for instantiation of the NS instance. In this way, the NFVO can determine, in the NSD based on the information about the at least one instantiated VNF in the NS instantiation request, a VNF deployment flavor corresponding to the information about the at least one instantiated VNF, and further obtain, based on the VNF deployment flavor, the VNF service level information deployed by the OSS/BSS.

Specifically, for the NS update request herein, refer to the descriptions in FIG. 2. To avoid repetition, details are not described herein again.

403. The NFVO sends a VNF instantiation request to a VNFM.

The VNF instantiation request includes a VNF instance identifier ID and a VNF deployment flavor identifier. When receiving the VNF instantiation request, the VNFM obtains, through parsing, the VNF service level information.

Specifically, the VNFM may determine, based on the VNF instance ID in the VNF instantiation request, a VNF instance identified by the VNF instance ID, and further determine information about a VNFD used for instantiation of the VNF instance. In this way, the VNFM can determine, in the VNFD based on the VNF deployment flavor identifier in the VNF instantiation request, a VNF deployment flavor identified by the VNF deployment flavor identifier, and further obtain service level information of the VNF instance based on the VNF deployment flavor.

Specifically, for the VNF instantiation request herein, refer to the descriptions in FIG. 2. To avoid repetition, details are not described herein again.

404. The NFVO sends a virtual network resource allocation request to a VIM/WIM.

Specifically, when the NFVO sends the virtual network resource allocation request to the VIM/WIM, the NFVO sends, in the request message, VL service level information and another parameter.

Specifically, for the virtual network resource allocation request, refer to the foregoing descriptions. To avoid repetition, details are not described herein again.

405. The VNFM performs preliminary resource selection based on service level information.

Specifically, the VNFM obtains, from the VNF instantiation request through parsing, service level information of a VNF that needs to be instantiated; and then performs preliminary resource selection based on the service level information of the VNF and according to an affinity/anti-affinity rule.

406. The VNFM sends a GrantVnfLifecycleOperation (Grant Vnf Lifecycle, LCM) request to the NFVO, and the VNFM sends, in the request message, the VNF service level information and another parameter.

407. The NFVO deploys resources in some locations (a data center) based on the service level information and according to an affinity/anti-affinity rule, and if the resources are insufficient, performs resource adjustment based on the service level information and according to a resource management policy.

408. The NFVO sends a VNF LCM operation application reply to the VNFM.

409. The VNFM sends a virtual computing resource allocation request to the VIM/WIM.

410. The VNFM sends a virtual storage resource allocation request to the VIM/WIM.

411. The VNFM sends a virtual network resource allocation request to the VIM/WIM.

Operations 409 to 411 are a direct-mode cyclic process.

409'. The VNFM sends a virtual computing resource allocation request to the NFVO.

410'. The VNFM sends a virtual storage resource allocation request to the NFVO.

411'. The VNFM sends a virtual network resource allocation request to the NFVO.

412'. The NFVO sends a virtual computing resource allocation request to the VIM/WIM.

413'. The NFVO sends a virtual storage resource allocation request to the VIM/WIM.

414'. The NFVO sends a virtual network resource allocation request to the VIM/WIM.

Operations 409' to 414' are an indirect-mode cyclic process.

Specifically, for the virtual computing resource allocation request, the virtual storage resource allocation request, and the virtual network resource allocation request, refer to the foregoing descriptions. To avoid repetition, details are not described herein again.

415. The VIM/WIM allocates a resource based on the service level information.

In this way, the NFV system modules (the NFVO, the VNFM, and the VIM or the WIM) can implement, based on a requirement implied in service level information, differentiated allocation, management, and provisioning for virtualized resources used by different VNFs, so as to meet virtualized-resource availability requirements of the different VNFs.

Figure 5A:
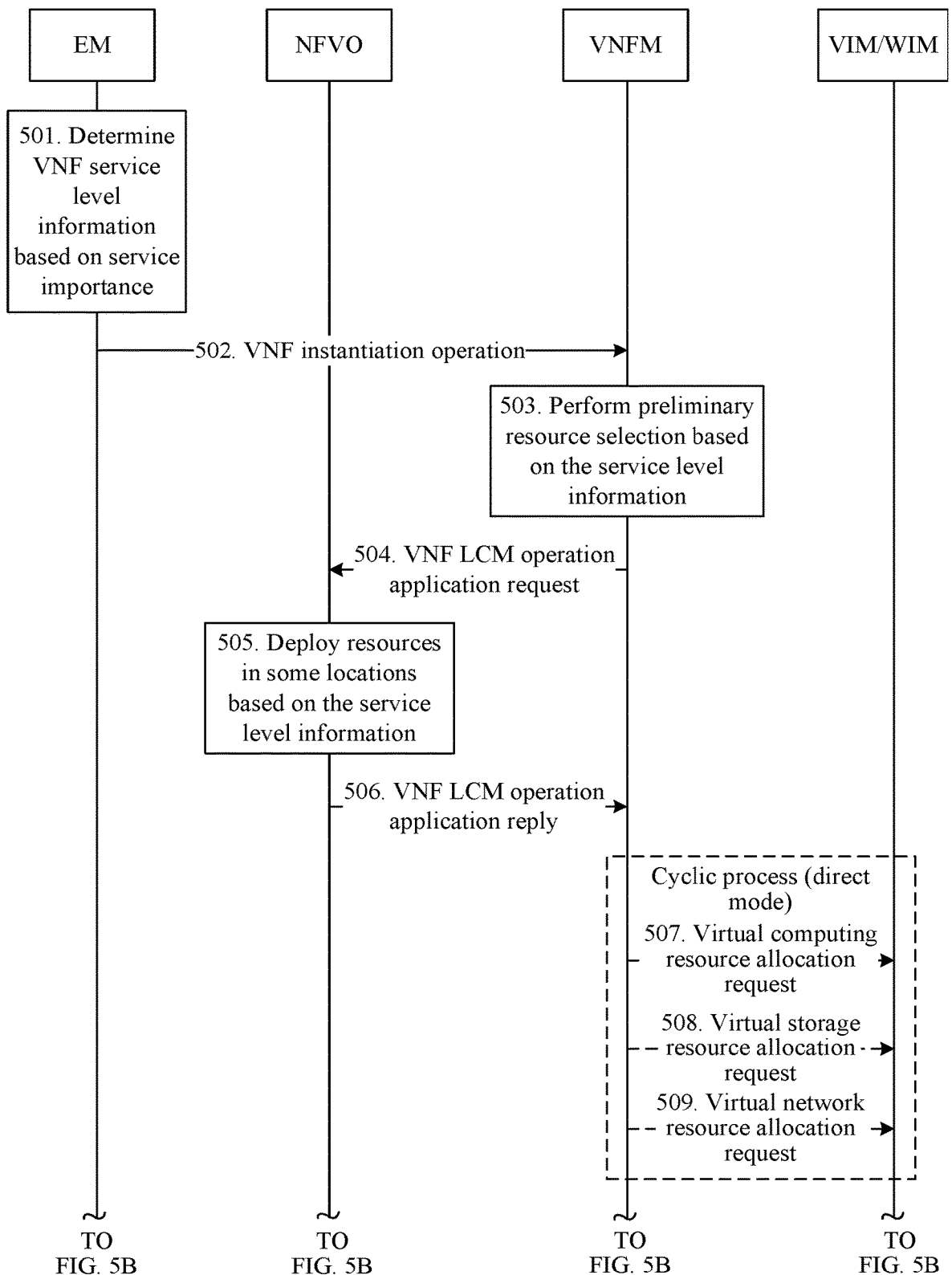
FIG. 5A and FIG. 5B show a specific example of another service management method according to an embodiment of this application.
Figure 5B:
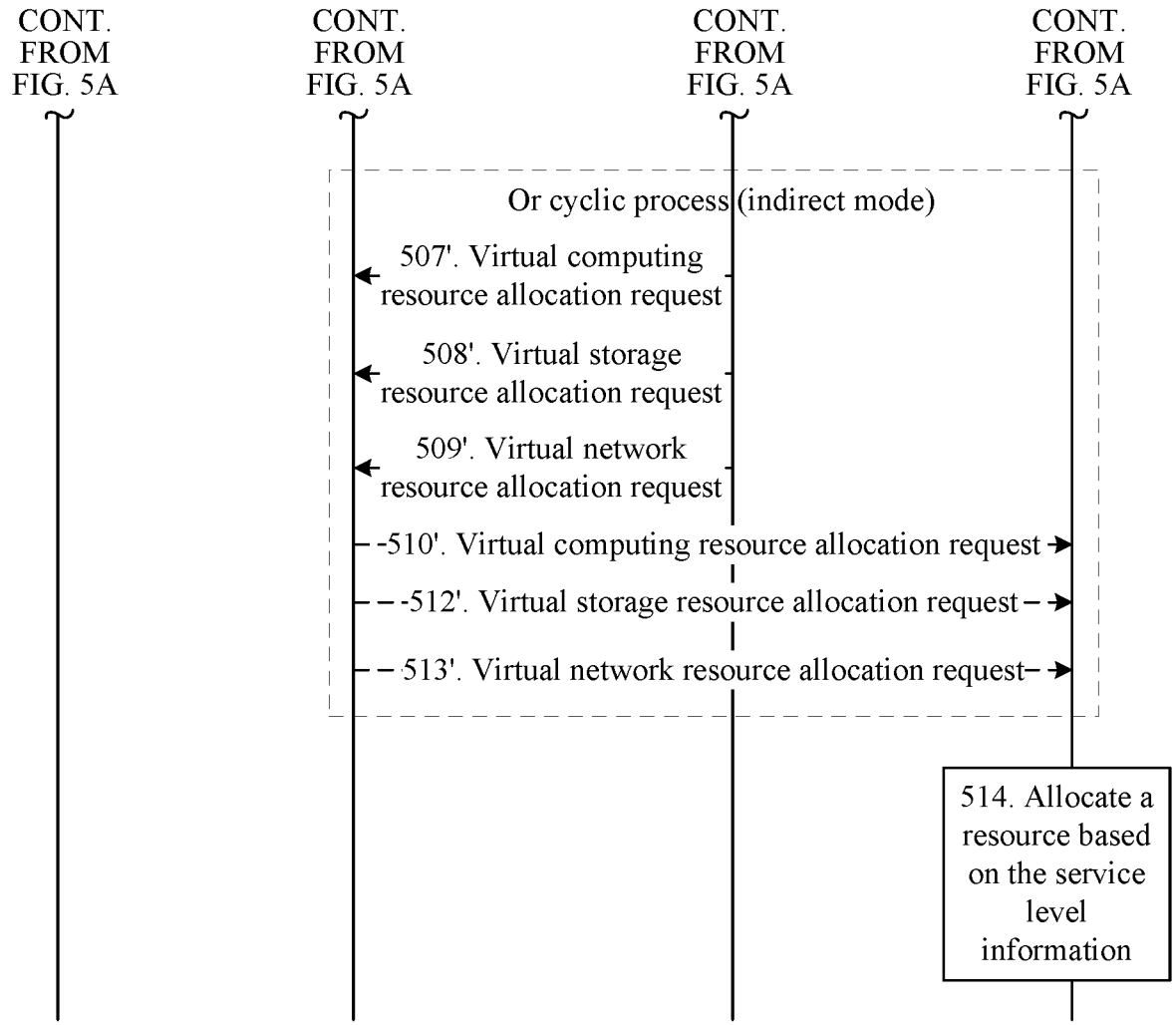

FIG. 5A and FIG. 5B are a schematic flowchart of a service management method provided in an embodiment of this application. It should be understood that FIG. 5A and FIG. 5B show operations of a service processing method; however, the operations are merely examples, and other operations or variations of the operations in FIG. 5A and FIG. 5B may be further performed in this embodiment of this application. In addition, the operations in FIG. 5A and FIG. 5B may be performed in a sequence different from that shown in FIG. 5A and FIG. 5B, and some operations in FIG. 5A and FIG. 5B may not need to be performed.

501. An EM determines VNF service level information based on service importance.

The EM may select and deploy appropriate service level information for a VNF based on a degree of importance of a service carried on the VNF.

In an example, when a VNF deployment flavor VNF DF includes the VNF service level information, the EM may select, from a VNF deployment flavor VNF DF set in a VNF descriptor VNFD based on the service level information and another VNF instantiation parameter, a VNF DF ID of a VNF deployment flavor VNF DF corresponding to the service level information, and use the VNF DF ID as a VNF DF ID for VNF instantiation.

For example, when an SAL value selected and deployed by the EM for the VNF is a fourth SAL value, the EM selects, from the VNF DF set in the VNFD, a VNF DF ID of a VNF DF corresponding to the fourth SAL value, and uses the VNF DF ID as the VNF DF ID for VNF instantiation.

For another example, when a VNF service priority level selected and deployed by a service provider for the VNF is a fourth level, and an identifier corresponding to the fourth level is a third identifier, the EM selects, from the VNF DF set in the VNFD, a VNF DF ID of a VNF DF corresponding to the fourth identifier, and uses the VNF DF ID as the VNF DF ID for VNF instantiation.

502. The EM sends a VNF instantiation request to a VNFM.

In this case, the VNF instantiation request includes a VNF instance identifier ID and a VNF deployment flavor identifier. When receiving the VNF instantiation request, the VNFM obtains, through parsing, service level information of a VNF instance.

Specifically, after the EM sends the VNF instantiation request to the VNFM, the VNFM may determine, based on the VNF instance ID in the VNF instantiation request, a VNF instance identified by the VNF instance ID, and further determine information about a VNFD used for instantiation of the VNF instance. In this way, the VNFM can determine, in the VNFD based on the VNF deployment flavor identifier in the VNF instantiation request, a VNF deployment flavor identified by the VNF deployment flavor identifier, and further obtain service level information of the VNF instance based on the VNF deployment flavor.

Specifically, for the VNF instantiation request herein, refer to the descriptions in FIG. 2. To avoid repetition, details are not described herein again.

503. The VNFM performs preliminary resource selection based on the service level information.

Specifically, the VNFM obtains, from the VNF instantiation request through parsing, service level information of a VNF that needs to be instantiated; and then performs preliminary resource selection based on the service level information of the VNF and according to an affinity/anti-affinity rule.

504. The VNFM sends a GrantVnfLifecycleOperation (Grant Vnf Lifecycle, LCM) request to an NFVO, and the VNFM sends, in the request message, the VNF service level information and another parameter.

505. The NFVO deploys resources in some locations (a data center) based on the service level information and according to an affinity/anti-affinity rule, and if the resources are insufficient, performs resource adjustment based on the service level information and according to a resource management policy.

506. The NFVO sends a VNF LCM operation application reply to the VNFM.

507. The VNFM sends a virtual computing resource allocation request to a VIM/WIM.

508. The VNFM sends a virtual storage resource allocation request to the VIM/WIM.

509. The VNFM sends a virtual network resource allocation request to the VIM/WIM.

Operations 507 to 509 are a direct-mode cyclic process.

507'. The VNFM sends a virtual computing resource allocation request to the NFVO.

508'. The VNFM sends a virtual storage resource allocation request to the NFVO.

509'. The VNFM sends a virtual network resource allocation request to the NFVO.

510'. The NFVO sends a virtual computing resource allocation request to the VIM/WIM.

511'. The NFVO sends a virtual storage resource allocation request to the VIM/WIM.

512'. The NFVO sends a virtual network resource allocation request to the VIM/WIM.

Operations 510' to 512' are an indirect-mode cyclic process.

Specifically, for the virtual computing resource allocation request, the virtual storage resource allocation request, and the virtual network resource allocation request, refer to the foregoing descriptions. To avoid repetition, details are not described herein again.

514. The VIM/WIM allocates a resource based on the service level information.

In this way, the NFV system modules (the NFVO, the VNFM, and the VIM or the WIM) can implement, based on a requirement implied in service level information, differentiated allocation, management, and provisioning for virtualized resources used by different VNFs, so as to meet virtualized-resource availability requirements of the different VNFs.

The following describes in detail a service management apparatus provided in the embodiments of this application, with reference to FIG. 6 to FIG. 11.

Figure 6:
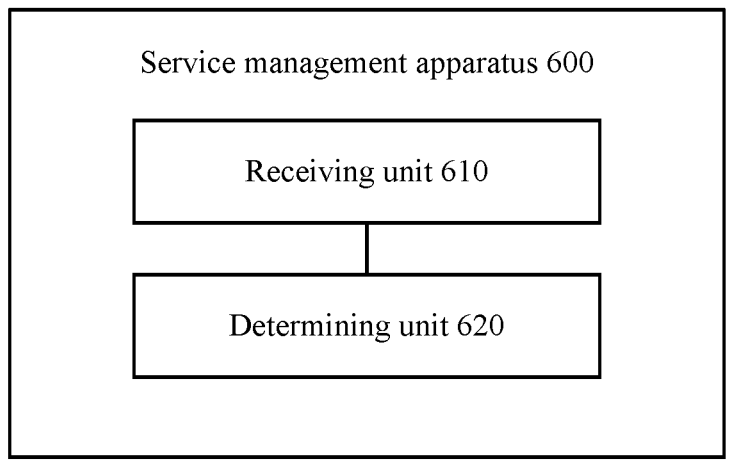
FIG. 6 is a schematic diagram of a service management apparatus according to an embodiment of this application.

FIG. 6 is a schematic block diagram of a service management apparatus 600 provided in an embodiment of this application. The apparatus 600 includes a receiving unit 610 and a determining unit 620.

The receiving unit 610 is configured to receive a first message sent by a second management unit. The first message includes first identification information. The first identification information is used to obtain first information. The first information includes information used to obtain first service level information. The first information is a network service NS deployment flavor DF or a virtualized network function VNF deployment flavor DF.

The determining unit 620 is configured to determine the first service level information based on the first identification information and the first information.

In this embodiment of this application, the first management unit receives the first message sent by the second management unit, and then may determine the first service level information based on the first message, so as to cover service level indication information at interfaces between various management network elements in NFV MANO, and further perform differentiated resource allocation and fault recovery for services based on the service level indication information.

In one embodiment, the first message is used to request an operation of network service instantiation.

A parameter required for the network service instantiation is provided by using a network service descriptor NSD. The NSD includes at least one NS DF. Each of the at least one NS DF is determined based on an identifier of each NS DF. Each of the at least one NS DF includes network service NS service level information.

In one embodiment, the first identification information is a first network service NS instance identifier ID and a first network service deployment flavor identifier NS DF ID. The first NS DF ID is used to identify a first NS DF. A first network service descriptor NSD used for an NS instance identified by the first NS instance ID includes at least the first NS DF.

The determining unit 620 is specifically configured to:
use network-service service level information in the first NS DF as the first service level information based on the first NS instance ID and the first NS DF ID.

In one embodiment, the determining unit 620 is further configured to:
determine at least one VNF and at least one VL in the first NS instance; and
use the first service level information as service level information of each of the at least one VNF, and use the first service level information as service level information of each of the at least one VL.

In one embodiment, the network service NS service level information includes at least one of a network-service service availability level SAL or network-service service priority indication information.

In one embodiment, when the network-service service level information includes the network-service service priority indication information, the network-service service priority indication information is specifically a network service NS service priority identifier, and the network service NS service priority identifier is used to indicate the network service NS service priority level.

In one embodiment, the first message further includes second identification information. The second identification information is used to identify a first correspondence. The first correspondence includes a one-to-one correspondence between at least one network service NS service priority identifier and at least one network service NS service priority level.

The determining unit 620 is specifically configured to:
determine, for the first management unit based on the first identification information, the second identification information, and the first information, a network-service service priority level indicated by the first service level information.

In one embodiment, the first message is used to request an operation of network service instantiation.

Information required for the network service instantiation is provided by using a network service descriptor NSD. The network service descriptor NSD includes at least one network service deployment flavor NS DF. Each of the at least one NS DF is determined based on an identifier. Each of the at least one NS DF includes at least one virtualized network function profile VNF profile. Each of the at least one virtualized network function profile VNF profile includes one virtualized network function descriptor VNFD and one virtualized network function deployment flavor VNF DF. The virtualized network function descriptor VNFD includes at least one virtualized network function deployment flavor VNF DF. The virtualized network function deployment flavor VNF DF includes virtualized network function service level information. The virtualized network function profile VNF profile is represented by using a VNF profile ID in the NS DF. The VNFD is represented by using a VNFD ID in the VNF profile. The VNF DF is represented by using a VNF DF ID in the VNF profile and the VNFD.

In one embodiment, the first identification information is a second NS instance ID and a second NS DF ID. The second NS DF ID is used to identify a second NS DF. A second NSD used for instantiation of a second NS instance identified by the second NS instance ID includes at least the second NS DF. The second NS DF includes at least one first virtualized network function profile VNF profile. Each of the first virtualized network function profile VNF profile includes a first virtualized network function descriptor identifier VNFD ID and a first virtualized network function deployment flavor identifier VNF DF ID. The first VNF DF ID is used to identify a first VNF DF. The first VNFD includes at least the first VNF DF.

The determining unit 620 is specifically configured to:
determine the second NS DF based on the second NS instance ID and the second NS DF ID; and
determine, based on an identifier of each of the at least one first virtualized network function profile VNF profile in the second NS DF, each first VNFD ID and each first VNF DF ID that are included in each first virtualized network function profile VNF profile, and use virtualized network function service level information in each first VNF DF as the first service level information.

In one embodiment, the first message is used to request an operation of virtualized network function instantiation.

Information required for the virtualized network function instantiation is provided by using a virtualized network function descriptor VNFD. The virtualized network function descriptor VNFD includes at least one virtualized network function deployment flavor VNF DF. Each of the at least one VNF DF is determined based on an identifier of each VNF DF. Each of the at least one VNF DF includes one piece of virtualized network function service level information.

In one embodiment, the first identification information is a second VNF instance ID and a second VNF DF ID. The second VNF DF ID is used to identify a second VNF DF. A second virtualized network function descriptor VNFD used for instantiation of a VNF instance identified by the second VNF instance ID includes at least the second VNF DF.

The determining unit 620 is specifically configured to:
use virtualized network function service level information in the second VNF DF as the first service level information based on the second VNF instance ID and the second VNF DF ID.

In one embodiment, the first message is an NS update request message, and in this case, the first identification information is a third NS instance ID that needs to be updated. The first message further includes information about at least one instantiated VNF. A third NS instance identified by the third NS instance ID includes the information about the at least one instantiated VNF. Each piece of the information about the at least one instantiated VNF includes the third VNFD ID and a third VNF DF ID. A third virtualized network function descriptor VNFD used for instantiation of a VNF instance identified by the third VNF instance ID includes at least the third VNF DF.

The determining unit 620 is specifically configured to:
use virtualized network function service level information in the third VNF DF as the first service level information based on the third NS instance ID and the information about the at least one instantiated VNF.

In one embodiment, the VNF service level information includes at least one of a VNF service availability level SAL or VNF service priority indication information.

In one embodiment, when the VNF service level information includes the VNF service priority indication information, the VNF service priority indication information is specifically a VNF service priority identifier, and the service priority identifier is used to indicate the VNF service priority level.

In one embodiment, the first message further includes third identification information. The third identification information is used to identify a second correspondence. The second correspondence includes a one-to-one correspondence between at least one service priority identifier and at least one service priority level.

The determining unit 620 is specifically configured to:
determine, based on the first identification information, the third identification information, and the first information, a VNF service priority level indicated by the first service level information.

In one embodiment, the apparatus 600 further includes a first record unit. If the first service level information is the network-service service level information, after the operation requested by the first message is successfully completed, the first record unit is configured to:
record the network-service service level information in an attribute of network service level indication information in a network service information element database, where the network service information element is used to record real-time status information of a network service instance, and the real-time status information of the network service instance includes the network-service service level information.

In one embodiment, the apparatus 600 further includes a first replacement unit.

The receiving unit is further configured to receive a second message. The second message is used to modify the network-service service level information in the network service information element. The second message includes indication information of second service level information.

The first replacement unit is configured to replace the network-service service level information in the network service information element with the second service level information.

In one embodiment, the apparatus 600 further includes a second record unit. If the first service level information is the VNF service level information, after the operation requested by the first message is successfully completed, the second record unit is configured to:

record the VNF service level information in an attribute of VNF indication information in a VNF information element database, where the VNF information element is used to record real-time status information of a VNF instance, and the real-time status information of the VNF instance includes the VNF service level information.

In one embodiment, the apparatus 600 further includes a second replacement unit.

The receiving unit is further configured to receive a third message. The third message is used to modify the VNF service level information in the VNF information element. The second message includes indication information of third service level information.

The second replacement unit is configured to replace the VNF service level information in the VNF information element with the third service level information.

In one embodiment, if the first message is a network service instantiation request, or if the first message is an NS update message, the apparatus is an NFVO, and the second management unit is an OSS/BSS; or if the first message is a VNF instantiation request, the apparatus is a VNFM and the second management unit is an EM, or the apparatus is a VNFM and the second management unit is an NFVO.

In one embodiment, the apparatus 600 further includes:

a sending unit, configured to send a fourth message to a third management unit, where the fourth message includes the virtualized network function VNF service level information, the virtualized network function VNF service level information is used to perform resource management or allocation on a virtual resource required for a virtualized network function VNF instance, and the virtual resource includes at least one of a virtual computing resource, a virtual storage resource, or a virtual network resource.

In one embodiment, the apparatus 600 is an NFVO or a VNFM, and the third management unit is a VIM/WIM.

The fourth message is a virtualized-resource allocation request message, a virtualized-resource migration request message, a virtualized-resource extension request message, or a virtualized-resource creation and reservation request message.

Figure 7:
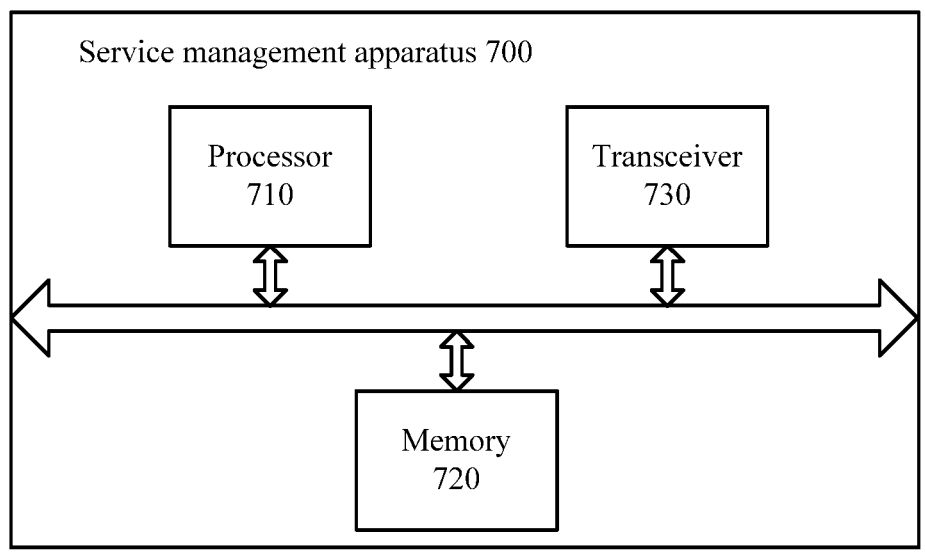
FIG. 7 is a schematic diagram of another service management apparatus according to an embodiment of this application.

It should be noted that, in this embodiment of the present invention, the receiving unit 610 may be implemented by a transceiver, and the determining unit 620 may be implemented by a processor. As shown in FIG. 7, a service management apparatus 700 may include a processor 710, a memory 720, and a transceiver 730. The memory 720 may be configured to store code to be executed by the processor 710, and the like. The processor 710 may be configured to process data or a program.

In one embodiment, operations of the foregoing methods may be implemented by using a hardware integrated logic circuit in the processor 710, or by using an instruction in a form of software. The operations of the methods disclosed with reference to the embodiments of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 720, and the processor 710 reads information in the memory 720 and completes the operations of the foregoing methods in combination with hardware of the processor. To avoid repetition, details are not described herein again.

The service management apparatus 600 shown in FIG. 6 or the service management apparatus 700 shown in FIG. 7 can implement the processes corresponding to the first management unit in the foregoing method embodiments. Specifically, for the service management apparatus 600 or the service management apparatus 700, refer to the foregoing descriptions. To avoid repetition, details are not described herein again.

Figure 8:
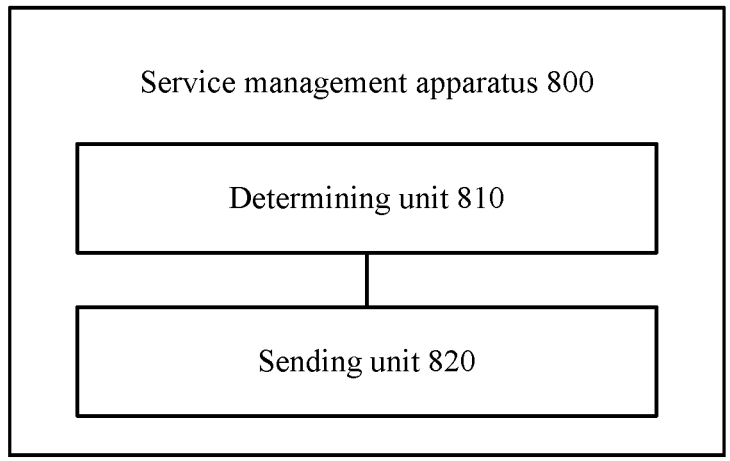
FIG. 8 is a schematic diagram of another service management apparatus according to an embodiment of this application.

FIG. 8 is a schematic block diagram of a service management apparatus 800 provided in an embodiment of this application. The apparatus 800 includes a determining unit 810 and a sending unit 820.

The determining unit 810 is configured to determine a first message. The first message includes first identification information. The first identification information is used to obtain first information. The first information includes information used to obtain first service level information. The first information is a network service NS deployment flavor DF or a virtualized network function VNF deployment flavor DF.

The sending unit 820 is configured to send the first message to a first management unit, so that the first management unit determines the first service level information based on the first identification information and the first information.

In this embodiment of this application, the first management unit receives the first message sent by the second management unit, and then may determine the first service level information based on the first message, so as to cover service level indication information at interfaces between various management network elements in NFV MANO, and further perform differentiated resource allocation and fault recovery for services based on the service level indication information.

In one embodiment, the first message is used to request an operation of network service instantiation.

A parameter required for the network service instantiation is provided by using a network service descriptor NSD. The NSD includes at least one NS DF. Each of the at least one NS DF is determined based on an identifier of each NS DF. Each of the at least one NS DF includes network service NS service level information.

In one embodiment, the first identification information is a first network service NS instance identifier ID and a first network service deployment flavor identifier NS DF ID. The first NS DF ID is used to identify a first NS DF. A first network service descriptor NSD used for an NS instance identified by the first NS instance ID includes at least the first NS DF.

In one embodiment, the network service NS service level information includes at least one of a network-service service availability level SAL or network-service service priority indication information.

In one embodiment, when the network-service service level information includes the network-service service priority indication information, the network-service service priority indication information is specifically a network service NS service priority identifier, and the network service NS service priority identifier is used to indicate the network service NS service priority level.

In one embodiment, the first message further includes second identification information. The second identification information is used to identify a first correspondence. The first correspondence includes a one-to-one correspondence between at least one network service NS service priority identifier and at least one network service NS service priority level.

In one embodiment, the first message is used to request an operation of network service instantiation.

Information required for the network service instantiation is provided by using a network service descriptor NSD. The network service descriptor NSD includes at least one network service deployment flavor NS DF. Each of the at least one NS DF is determined based on an identifier. Each of the at least one NS DF includes at least one virtualized network function profile VNF profile. Each of the at least one virtualized network function profile VNF profile includes one virtualized network function descriptor VNFD and one virtualized network function deployment flavor VNF DF. The virtualized network function descriptor VNFD includes at least one virtualized network function deployment flavor VNF DF. The virtualized network function deployment flavor VNF DF includes virtualized network function service level information. The virtualized network function profile VNF profile is represented by using a VNF profile ID in the NS DF. The VNFD is represented by using a VNFD ID in the VNF profile. The VNF DF is represented by using a VNF DF ID in the VNF profile and the VNFD.

In one embodiment, the first identification information is a second NS instance ID and a second NS DF ID. The second NS DF ID is used to identify a second NS DF. A second NSD used for instantiation of a second NS instance identified by the second NS instance ID includes at least the second NS DF. The second NS DF includes at least one first virtualized network function profile VNF profile. Each of the first virtualized network function profile VNF profile includes a first virtualized network function descriptor identifier VNFD ID and a first virtualized network function deployment flavor identifier VNF DF ID. The first VNF DF ID is used to identify a first VNF DF. The first VNFD includes at least the first VNF DF.

In one embodiment, the first message is used to request an operation of virtualized network function instantiation.

Information required for the virtualized network function instantiation is provided by using a virtualized network function descriptor VNFD. The virtualized network function descriptor VNFD includes at least one virtualized network function deployment flavor VNF DF. Each of the at least one VNF DF is determined based on an identifier of each VNF DF. Each of the at least one VNF DF includes one piece of virtualized network function service level information.

In one embodiment, the first identification information is a second VNF instance ID and a second VNF DF ID. The second VNF DF ID is used to identify a second VNF DF. A second virtualized network function descriptor VNFD used for instantiation of a VNF instance identified by the second VNF instance ID includes at least the second VNF DF.

In one embodiment, the first message is an NS update request message, and in this case the first identification information is a third NS instance ID that needs to be updated. The first message further includes information about at least one instantiated VNF. A third NS instance identified by the third NS instance ID includes the information about the at least one instantiated VNF. Each piece of the information about the at least one instantiated VNF includes the third VNFD ID and a third VNF DF ID. A third virtualized network function descriptor VNFD used for instantiation of a VNF instance identified by the third VNF instance ID includes at least the third VNF DF.

In one embodiment, the VNF service level information includes at least one of a VNF service availability level SAL or VNF service priority indication information.

In one embodiment, when the VNF service level information includes the VNF service priority indication information, the VNF service priority indication information is specifically a VNF service priority identifier, and the service priority identifier is used to indicate the VNF service priority level.

In one embodiment, the first message further includes third identification information. The third identification information is used to identify a second correspondence. The second correspondence includes a one-to-one correspondence between at least one service priority identifier and at least one service priority level.

In one embodiment, if the first service level information is the network-service service level information, after the operation requested by the first message is successfully completed, the sending unit is further configured to:

send a second message to the first management unit, where the second message is used to modify the network-service service level information in a network service information element, the second message includes indication information of second service level information, the network service information element is used to record real-time status information of a network service instance, and the real-time status information of the network service includes the network-service service level information.

In one embodiment, if the first service level information is the VNF service level information, after the operation requested by the first message is successfully completed, the sending unit is further configured to:

send a third message to the first management unit, where the third message is used to modify the VNF service level information in a VNF information element, the third message includes indication information of second service level information, the VNF information element is used to record real-time status information of a VNF instance, and the real-time status information of the VNF includes the VNF service level information.

In one embodiment, if the first message is a network service instantiation request, or if the first message is an NS update message, the first management unit is an NFVO, and the apparatus is an OSS/BSS; or when the first message is a VNF instantiation request, the first management unit is a VNFM and the apparatus is an EM, or the first management unit is a VNFM and the apparatus is an NFVO.

Figure 9:
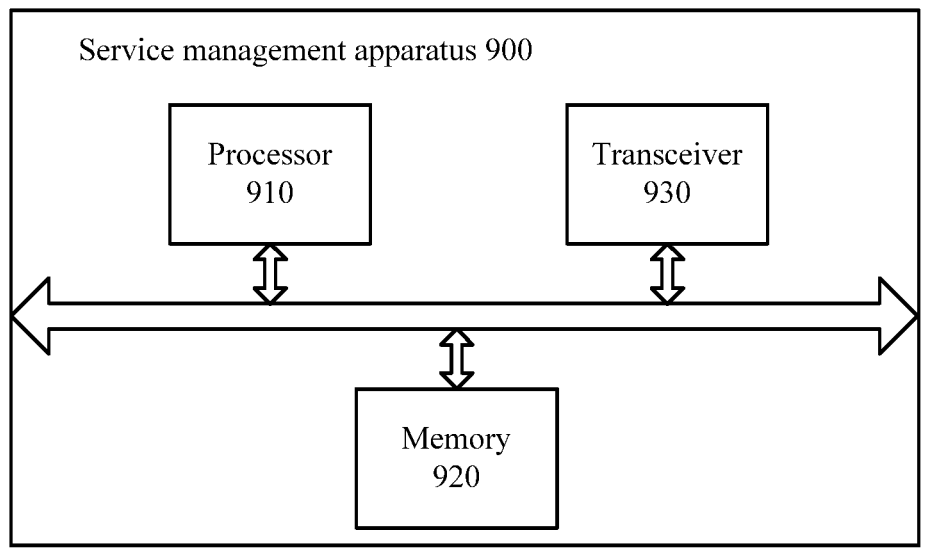
FIG. 9 is a schematic diagram of another service management apparatus according to an embodiment of this application.

It should be noted that, in this embodiment of the present invention, the sending unit 820 may be implemented by a transceiver, and the determining unit 810 may be implemented by a processor. As shown in FIG. 9, a service management apparatus 900 may include a processor 910, a memory 920, and a transceiver 930. The memory 920 may be configured to store code to be executed by the processor 910, and the like. The processor 910 may be configured to process data or a program.

In one embodiment, operations of the foregoing methods may be implemented by using a hardware integrated logic circuit in the processor 910, or by using an instruction in a form of software. The operations of the methods disclosed with reference to the embodiments of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 920, and the processor 910 reads information in the memory 920 and completes the operations of the foregoing methods in combination with hardware of the processor. To avoid repetition, details are not described herein again.

The service management apparatus 800 shown in FIG. 8 or the service management apparatus 900 shown in FIG. 9 can implement the processes corresponding to the second management unit in the foregoing method embodiments. Specifically, for the service management apparatus 800 or the service management apparatus 900, refer to the foregoing descriptions. To avoid repetition, details are not described herein again.

Figure 10:
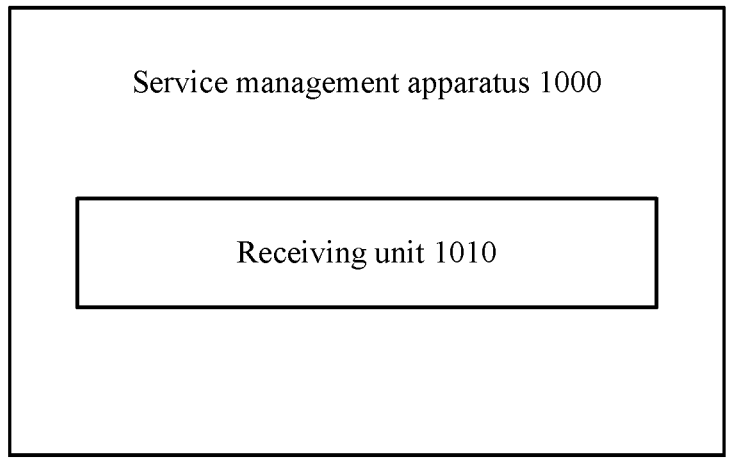
FIG. 10 is a schematic diagram of another service management apparatus according to an embodiment of this application.

FIG. 10 is a schematic block diagram of a service management apparatus 1000 provided in an embodiment of this application. The apparatus 1000 includes a receiving unit 1010.

The receiving unit 1010 is configured to receive a fourth message sent by a first management unit. The fourth message includes virtualized network function VNF service level information. The VNF service level information is used to perform resource management or allocation on a virtual resource required for a virtualized network function VNF instance. The virtual resource includes at least one of a virtual computing resource, a virtual storage resource, or a virtual network resource.

In one embodiment, the first management unit is an NFVO or a VNFM, and the apparatus is a VIM/WIM.

The fourth message is a virtualized-resource allocation request message, a virtualized-resource migration request message, a virtualized-resource extension request message, or a virtualized-resource creation and reservation request message.

Figure 11:
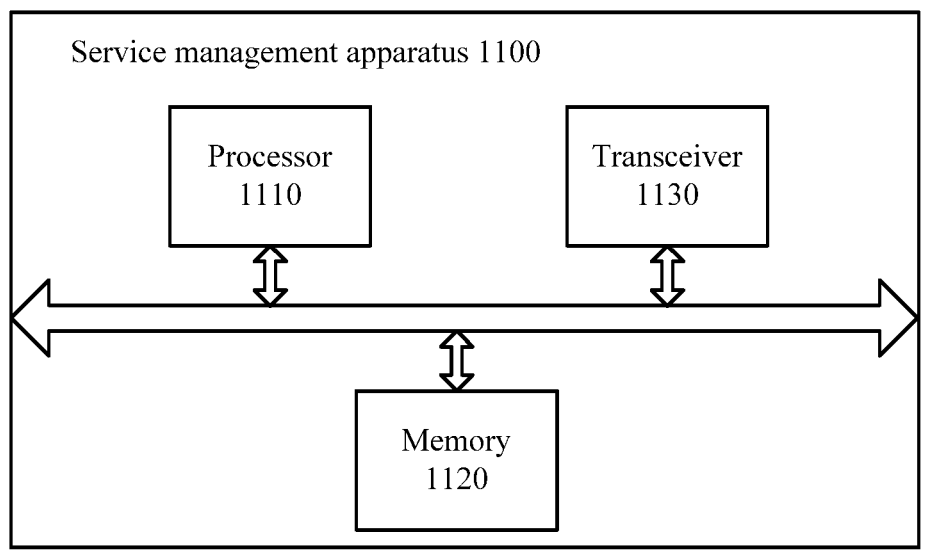
FIG. 11 is a schematic diagram of another service management apparatus according to an embodiment of this application.

It should be noted that, in this embodiment of the present invention, the receiving unit 1010 may be implemented by a transceiver. As shown in FIG. 11, a service management apparatus 1100 may include a processor 1110, a memory 1120, and a transceiver 1130. The memory 1120 may be configured to store code to be executed by the processor 1110, and the like. The processor 1110 may be configured to process data or a program.

In one embodiment, operations of the foregoing methods may be implemented by using a hardware integrated logic circuit in the processor 1110, or by using an instruction in a form of software. The operations of the methods disclosed with reference to the embodiments of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 1120, and the processor 1110 reads information in the memory 1120 and completes the operations of the foregoing methods in combination with hardware of the processor. To avoid repetition, details are not described herein again.

The service management apparatus 1000 shown in FIG. 10 or the service management apparatus 1100 shown in FIG. 11 can implement the processes corresponding to the third management unit in the foregoing method embodiments. Specifically, for the service management apparatus 1000 or the service management apparatus 1100, refer to the foregoing descriptions. To avoid repetition, details are not described herein again.

An embodiment of this application further provides a computer readable medium, configured to store a computer program. The computer program includes an instruction used to perform the method corresponding to the first management unit, the second management unit, or the third management unit in the foregoing method embodiments.

An embodiment of this application further provides a computer program product. The computer program product includes computer program code. When the computer program code is run by a processing unit of an apparatus (for example, a service management apparatus) or a transceiver and a processor of an apparatus, the apparatus is enabled to perform the method corresponding to the first management unit or the second management unit in any one of the foregoing method embodiments.

The embodiments of this application may be independently used, or may be used in combination. This is not limited herein.

It should be understood that the processor mentioned in the embodiments of the present invention may be a central processing unit (CPU), or may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

It should be further understood that the memory mentioned in the embodiments of the present invention may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of illustrative but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that, when the processor is a general purpose processor, a DSP, an ASIC, an FPGA or another programmable logic device, a discrete gate or transistor logic device, or a discrete hardware component, the memory (a storage module) is integrated into the processor.

It should be noted that the memory described in this specification is intended to include but is not limited to these memories and any other appropriate types of memories.

It should be understood that descriptions, such as first and second, appearing in the embodiments of this application are merely used as examples and used to distinguish between described objects, but do not indicate a sequential order and do not indicate a particular limitation on a quantity of devices in the embodiments of this application either, and cannot be construed as any limitation on the embodiments of this application.

It should be further understood that sequence numbers of the foregoing processes do not mean execution sequences in various embodiments of this application. The execution sequences of the processes should be determined based on functions and internal logic of the processes, and should not be construed as any limitation on the embodiments of this application.

A person of ordinary skill in the art may be aware that units and algorithm operations in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the embodiment goes beyond the scope of this application.

It may be clearly understood by a person skilled in the art that, for ease and brevity of description, for detailed working processes of the foregoing system, apparatus, and unit, reference may be made to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in some embodiments. For example, a plurality of units or components may be combined or may be integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected depending on actual requirements, to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in the embodiments of this application. The storage medium includes various media that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A service management method, comprising:
  receiving, by a transceiver of a first management apparatus, a first message sent by a second management unit, wherein the first message comprises first identification information, the first identification information is used to obtain first information, the first information comprises information used to obtain first service level information, the first information is a network service (NS) deployment flavor (DF), and the first message is used to request an operation of network service instantiation; and
  determining, by a processor of the first management apparatus, the first service level information based on the first identification information and the first information.

2. The method according to claim 1, wherein
  a parameter for the network service instantiation is provided by using a network service descriptor (NSD), the NSD comprises at least one NS DF, each of the at least one NS DF is determined based on an identifier of each NS DF, and each of the at least one NS DF comprises NS service level information.

3. The method according to claim 2, wherein the first identification information comprises a first NS instance identifier (ID) and a first network service deployment flavor identifier (NS DF ID), the first NS DF ID is used to identify a first NS DF, and a first NSD used for an NS instance identified by the first NS instance ID comprises at least the first NS DF; and
  the determining, by the processor of the first management apparatus, the first service level information based on the first identification information and the first information comprises:
  using, by the processor of the first management apparatus, the NS service level information in the first NS DF as the first service level information based on the first NS instance ID and the first NS DF ID.

4. The method according to claim 3, further comprising:
  determining, by the processor of the first management apparatus, at least one virtualized network function (VNF) and at least one virtual link (VL) in the first NS instance; and
  using, by the processor of the first management apparatus, the first service level information as service level information of each of the at least one VNF, and using the first service level information as service level information of each of the at least one VL.

5. The method according to claim 2, wherein the NS service level information comprises at least one of a network-service service availability level (SAL) or network-service service priority indication information.

6. The method according to claim 5, wherein when the NS service level information comprises the network-service service priority indication information, the network-service service priority indication information comprises a NS service priority identifier, and the NS service priority identifier is used to indicate a NS service priority level.

7. The method according to claim 6, wherein the first message further comprises second identification information, the second identification information is used to identify a first correspondence, and the first correspondence comprises a one-to-one correspondence between at least one NS service priority identifier and at least one NS service priority level; and
 the determining, by the processor of the first management apparatus, the first service level information based on the first identification information and the first information comprises:
 determining, by the processor of the first management apparatus based on the first identification information, the second identification information, and the first information, the NS service priority level indicated by the first service level information.

8. A service management method, comprising:
 determining, by a processor of a second management apparatus, a first message, wherein the first message comprises first identification information, the first identification information is used to obtain first information, the first information comprises information used to obtain first service level information, the first information is a network service (NS) deployment flavor (DF), and the first message is used to request an operation of network service instantiation; and
 sending, by a transceiver of the second management apparatus, the first message to a first management apparatus, so that a processor of the first management apparatus determines the first service level information based on the first identification information and the first information.

9. The method according to claim 8, wherein
 a parameter for the instantiation is provided by using a network service descriptor (NSD), the NSD comprises at least one NS DF, each of the at least one NS DF is determined based on an identifier of each NS DF, and each of the at least one NS DF comprises NS service level information.

10. The method according to claim 9, wherein the first identification information comprises a first NS instance identifier (ID) and a first network service deployment flavor identifier (NS DF ID), the first NS DF ID is used to identify a first NS DF, and a first NSD used for an NS instance identified by the first NS instance ID comprises at least the first NS DF.

11. The method according to claim 9, wherein the NS service level information comprises at least one of a network-service service availability level (SAL) or network-service service priority indication information.

12. The method according to claim 11, wherein when the NS service level information comprises the network-service service priority indication information, the network-service service priority indication information comprises a NS service priority identifier, and the NS service priority identifier is used to indicate a NS service priority level.

13. The method according to claim 12, wherein the first message further comprises second identification information, the second identification information is used to identify a first correspondence, and the first correspondence comprises a one-to-one correspondence between at least one NS service priority identifier and at least one NS service priority level.

14. A service management apparatus, comprising:
 a transceiver, configured to receive a first message sent by a transceiver of a second management apparatus, wherein the first message comprises first identification information, the first identification information is used to obtain first information, the first information comprises information used to obtain first service level information, the first information is a network service (NS) deployment flavor (DF), and the first message is used to request an operation of network service instantiation; and
 a processor, configured to determine the first service level information based on the first identification information and the first information.

15. The apparatus according to claim 14, wherein
 a parameter for the instantiation is provided by using a network service descriptor (NSD), the NSD comprises at least one NS DF, each of the at least one NS DF is determined based on an identifier of each NS DF, and each of the at least one NS DF comprises NS service level information.

16. The apparatus according to claim 15, wherein the first identification information comprises a first NS instance identifier (ID) and a first network service deployment flavor identifier (NS DF ID), the first NS DF ID is used to identify a first NS DF, and a first NSD used for an NS instance identified by the first NS instance ID comprises at least the first NS DF; and
 the processor is configured to:
 use NS service level information in the first NS DF as the first service level information based on the first NS instance ID and the first NS DF ID.

17. The apparatus according to claim 16, wherein the processor is further configured to:
 determine at least one virtualized network function (VNF) and at least one virtual link (VL) in the first NS instance; and
 use the first service level information as service level information of each of the at least one VNF, and use the first service level information as service level information of each of the at least one VL.

18. The apparatus according to claim 15, wherein the NS service level information comprises at least one of a network-service service availability level (SAL) or network-service service priority indication information.

19. The apparatus according to claim 18, wherein when the NS service level information comprises the network-service service priority indication information, the network-service service priority indication information comprises a NS service priority identifier, and the NS service priority identifier is used to indicate a NS service priority level.

20. The apparatus according to claim 18, wherein the first message further comprises second identification information, the second identification information is used to identify a first correspondence, and the first correspondence comprises a one-to-one correspondence between at least one NS service priority identifier and at least one NS service priority level.

\* \* \* \* \*

UNITED STATES PATENT AND TRADEMARK OFFICE
CERTIFICATE OF CORRECTION

PATENT NO. : 11,567,793 B2
APPLICATION NO. : 17/018517
DATED : January 31, 2023
INVENTOR(S) : Shaoji Ni and Xuewen Gong Page 1 of 1

It is certified that error appears in the above-identified patent and that said Letters Patent is hereby corrected as shown below:

In the Claims

In Claim 9, Column 47, Line 47, delete "a parameter for the instantiation" and insert --a parameter for the network service instantiation--.

In Claim 15, Column 48, Line 26, delete "a parameter for the instantiation" and insert --a parameter for the network service instantiation--.

Signed and Sealed this
Eighteenth Day of April, 2023

Katherine Kelly Vidal
*Director of the United States Patent and Trademark Office*